United States Patent
Michaelson

(10) Patent No.: US 12,539,156 B2
(45) Date of Patent: Feb. 3, 2026

(54) ROBOTIC HAND-HELD SURGICAL INSTRUMENT SYSTEMS AND METHODS

(71) Applicant: Stryker Corporation, Kalamazoo, MI (US)

(72) Inventor: Phillip Bryce Michaelson, Kalamazoo, MI (US)

(73) Assignee: Stryker Corporation, Portage, MI (US)

(*) Notice: Subject to any disclaimer, the term of this patent is extended or adjusted under 35 U.S.C. 154(b) by 456 days.

(21) Appl. No.: 18/251,628

(22) PCT Filed: Nov. 5, 2021

(86) PCT No.: PCT/US2021/058249
§ 371 (c)(1),
(2) Date: May 3, 2023

(87) PCT Pub. No.: WO2022/099002
PCT Pub. Date: May 12, 2022

(65) Prior Publication Data
US 2024/0008910 A1    Jan. 11, 2024

Related U.S. Application Data

(60) Provisional application No. 63/110,685, filed on Nov. 6, 2020.

(51) Int. Cl.
*A61B 17/90* (2006.01)
(52) U.S. Cl.
CPC .................................. *A61B 17/90* (2021.08)
(58) Field of Classification Search
CPC ....... A61B 90/30; A61B 90/20; A61B 17/151; A61B 17/15; A61B 17/90
See application file for complete search history.

(56) References Cited

U.S. PATENT DOCUMENTS

| | | |
|---|---|---|
| 6,342,057 B1 | 1/2002 | Brace et al. |
| 7,035,716 B2 | 4/2006 | Harris et al. |

(Continued)

FOREIGN PATENT DOCUMENTS

| | | |
|---|---|---|
| EP | 3569159 A1 | 11/2019 |
| EP | 3666212 A1 | 6/2020 |

(Continued)

OTHER PUBLICATIONS

English language abstract for JP 2009-022734 A extracted from espacenet.com database on Jun. 3, 2025, 2 pages.

(Continued)

*Primary Examiner* — Kevin T Truong
*Assistant Examiner* — Diana Jones
(74) *Attorney, Agent, or Firm* — Howard & Howard Attorneys PLLC

(57) ABSTRACT

The present teachings provide a hand-holdable body (14) adapted to be freely holdable by a hand of a user; and a trajectory assembly operatively connected with the hand-holdable body, the trajectory assembly including: a shaft (76) extending from the hand-holdable body; a pivot frame (26) coupled with the shaft. The trajectory assembly includes a guide member (20) pivotally connected with the pivot frame; a support member outwardly extending from and connected with the guide member; two actuators coextending and substantially parallel to an axis of the shaft with each actuator pivotally connected with the support member. The trajectory assembly converts linear movement of the actuators into pivotal movement of the guide member to adjust a trajectory axis. The guide member is adjustable to a target trajectory, adjusting the trajectory axis of the guide member in at least two degrees of freedom to align the trajectory axis with the target trajectory.

18 Claims, 22 Drawing Sheets

(56) References Cited

U.S. PATENT DOCUMENTS

| | | |
|---|---|---|
| 7,206,626 B2 | 4/2007 | Quaid, III |
| 7,206,627 B2 | 4/2007 | Abovitz et al. |
| 7,366,561 B2 | 4/2008 | Mills et al. |
| 7,422,582 B2 | 9/2008 | Malackowski et al. |
| 7,747,311 B2 | 6/2010 | Quaid, III |
| 7,753,913 B2 | 7/2010 | Szakelyhidi, Jr. et al. |
| 7,831,292 B2 | 11/2010 | Quaid et al. |
| 7,984,663 B2 | 7/2011 | Dent |
| 8,010,180 B2 | 8/2011 | Quaid et al. |
| 8,095,200 B2 | 1/2012 | Quaid, III |
| 8,197,484 B2 | 6/2012 | Sato et al. |
| 8,303,575 B2 | 11/2012 | Rodriguez Y Baena |
| 8,391,954 B2 | 3/2013 | Quaid, III |
| 8,449,552 B2 | 5/2013 | Sanders |
| 8,498,744 B2 | 7/2013 | Odermatt et al. |
| 8,571,628 B2 | 10/2013 | Kang et al. |
| 8,753,346 B2 | 6/2014 | Suarez et al. |
| 8,838,205 B2 | 9/2014 | Shoham et al. |
| 8,898,043 B2 | 11/2014 | Ashby et al. |
| 8,911,499 B2 | 12/2014 | Quaid et al. |
| 8,992,542 B2 | 3/2015 | Hagag et al. |
| 8,996,169 B2 | 3/2015 | Lightcap et al. |
| 9,002,426 B2 | 4/2015 | Quaid et al. |
| 9,008,757 B2 | 4/2015 | Wu |
| 9,119,638 B2 | 9/2015 | Schwarz et al. |
| 9,161,760 B2 | 10/2015 | Suarez et al. |
| 9,399,298 B2 | 7/2016 | Kang |
| 9,597,157 B2 | 3/2017 | Hagag et al. |
| 9,724,167 B2 | 8/2017 | Ziaei et al. |
| 9,770,306 B2 | 9/2017 | Hagag et al. |
| 9,775,681 B2 | 10/2017 | Quaid et al. |
| 9,788,966 B2 | 10/2017 | Steinberg |
| 9,801,686 B2 | 10/2017 | Lightcap et al. |
| 9,812,035 B2 | 11/2017 | Stuart et al. |
| 9,820,818 B2 | 11/2017 | Malackowski et al. |
| 9,937,014 B2 | 4/2018 | Bowling et al. |
| 10,052,166 B2 | 8/2018 | Ziaei et al. |
| 10,098,704 B2 | 10/2018 | Bowling et al. |
| 10,117,713 B2 | 11/2018 | Moctezuma de la Barrera et al. |
| 10,206,750 B2 | 2/2019 | Hagag et al. |
| 10,231,790 B2 | 3/2019 | Quaid et al. |
| 10,231,792 B2 | 3/2019 | Shiels et al. |
| 10,292,778 B2 | 5/2019 | Kostrzewski et al. |
| 10,327,849 B2 | 6/2019 | Post |
| 10,368,878 B2 | 8/2019 | Lavallee et al. |
| 10,369,708 B2 | 8/2019 | Kang |
| 10,410,746 B2 | 9/2019 | Moctezuma de la Barrera et al. |
| 10,441,294 B2 | 10/2019 | Lavallee et al. |
| 10,492,875 B2 | 12/2019 | Janik et al. |
| 10,603,119 B2 | 3/2020 | Ross et al. |
| 10,660,711 B2 | 5/2020 | Moctezuma de la Barrera et al. |
| 10,660,715 B2 | 5/2020 | Dozeman |
| 10,864,047 B2 | 12/2020 | Hagag et al. |
| 10,967,525 B2 | 4/2021 | Kang |
| 11,076,918 B2 | 8/2021 | Quaid, III |
| 11,123,881 B2 | 9/2021 | Kang |
| 11,253,329 B2 | 2/2022 | Bowling |
| 11,278,363 B2 | 3/2022 | Ross et al. |
| 11,369,438 B2 | 6/2022 | Malackowski et al. |
| 2006/0089624 A1 | 4/2006 | Voegele et al. |
| 2010/0137680 A1 | 6/2010 | Nishikawa et al. |
| 2011/0315413 A1 | 12/2011 | Fisher et al. |
| 2014/0171948 A1 | 6/2014 | Griffiths et al. |
| 2015/0202008 A1 | 7/2015 | Grant et al. |
| 2017/0112579 A1* | 4/2017 | Yen .................. B25J 15/0019 |
| 2017/0252110 A1 | 9/2017 | Link et al. |
| 2017/0258532 A1 | 9/2017 | Shalayev et al. |
| 2018/0085135 A1 | 3/2018 | Singh et al. |
| 2018/0333207 A1 | 11/2018 | Moctezuma De la Barrera |
| 2019/0167356 A1 | 6/2019 | Britton et al. |
| 2019/0223957 A1 | 7/2019 | Dekel et al. |
| 2019/0365391 A1 | 12/2019 | Nikou et al. |
| 2019/0388099 A1* | 12/2019 | Zuhars .................. A61B 34/10 |
| 2020/0179066 A1 | 6/2020 | Glozman et al. |
| 2020/0275943 A1 | 9/2020 | Keppler et al. |
| 2020/0323540 A1 | 10/2020 | Kang et al. |
| 2021/0029846 A1 | 1/2021 | Revankar et al. |
| 2021/0059656 A1 | 3/2021 | Otto et al. |
| 2021/0059771 A1 | 3/2021 | Hagag et al. |
| 2021/0093400 A1 | 4/2021 | Quaid et al. |
| 2021/0186632 A1 | 6/2021 | Quaid et al. |
| 2022/0022986 A1 | 1/2022 | Gilhooley et al. |
| 2022/0233251 A1 | 7/2022 | Bowling et al. |
| 2023/0105049 A1 | 4/2023 | Becker et al. |

FOREIGN PATENT DOCUMENTS

| | | |
|---|---|---|
| JP | 2009022734 A | 2/2009 |
| WO | 2011021192 A1 | 2/2011 |
| WO | 2019219348 A1 | 11/2019 |
| WO | WO-2020163457 A1 * | 8/2020 ............ A61B 34/20 |

OTHER PUBLICATIONS

International Search Report for Application No. PCT/US2021/058249 dated Mar. 4, 2022, 3 pages.

* cited by examiner

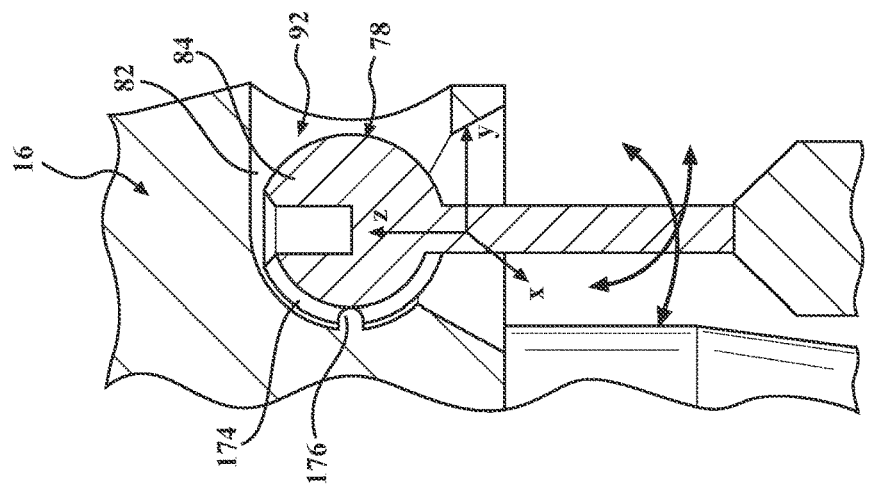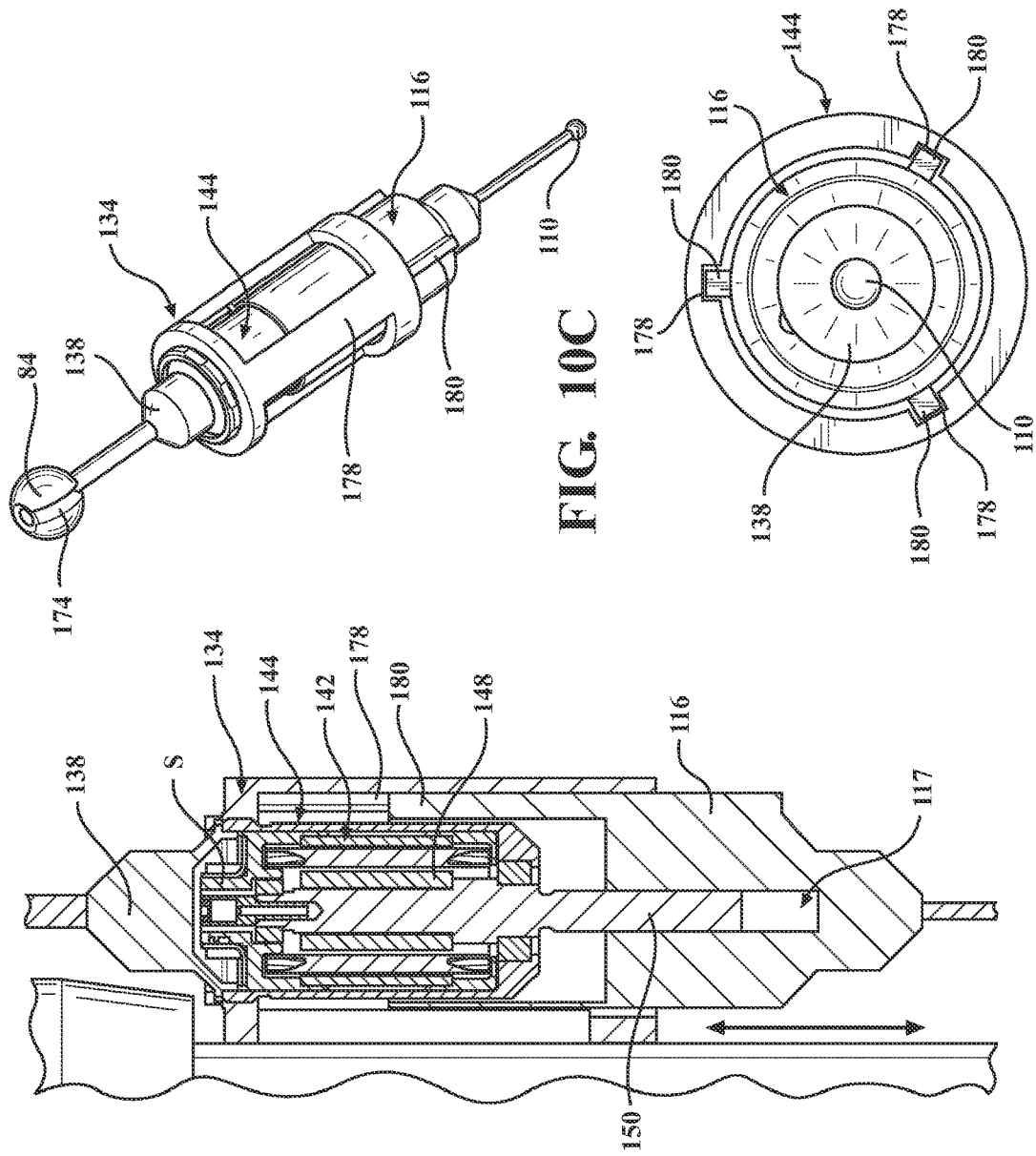

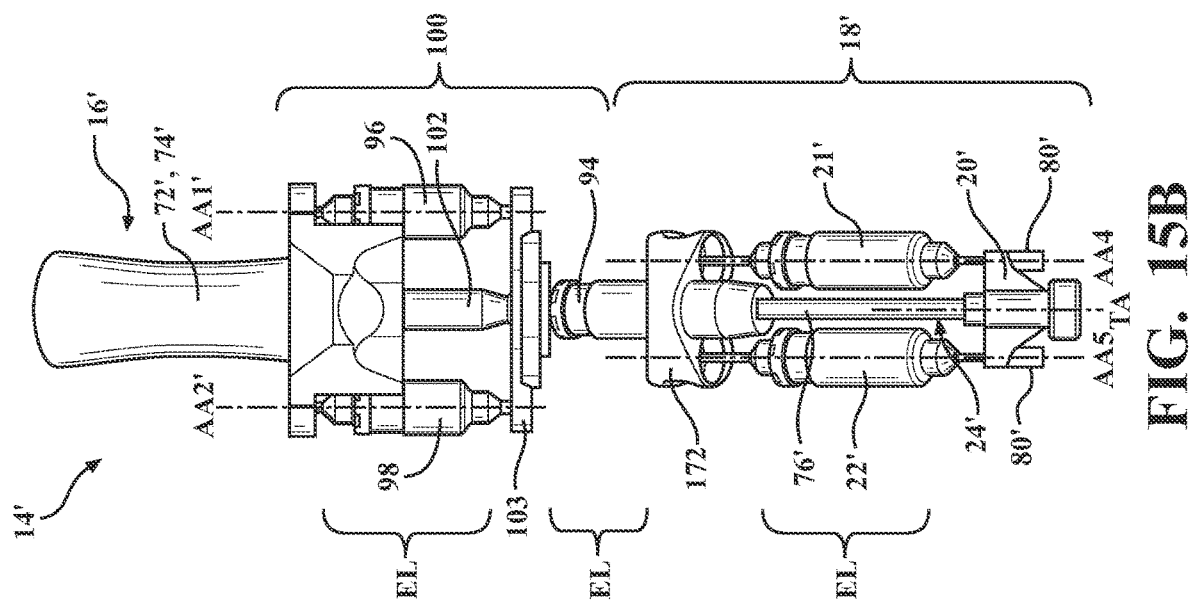
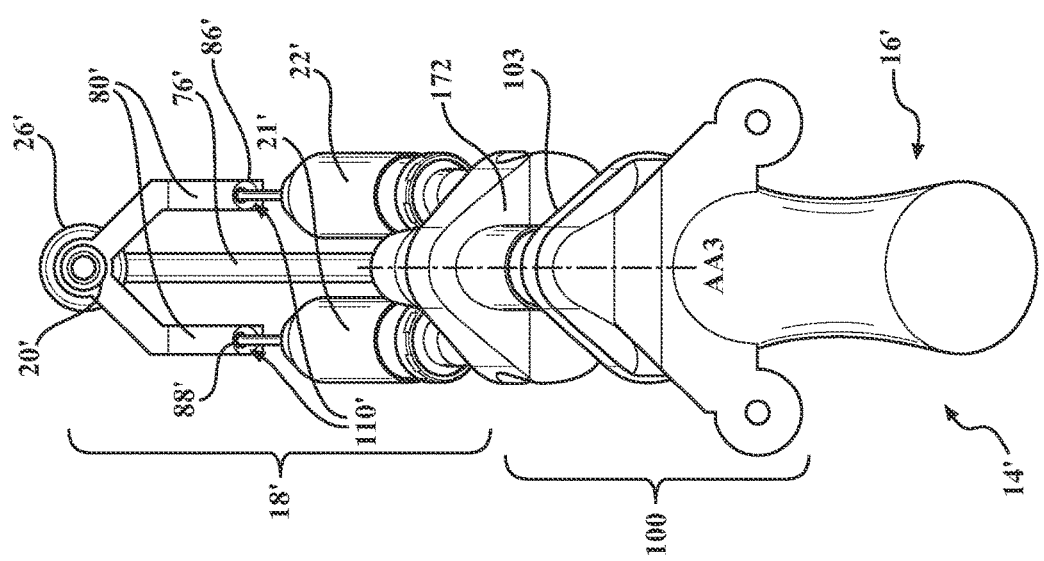
FIG. 15B
FIG. 15A

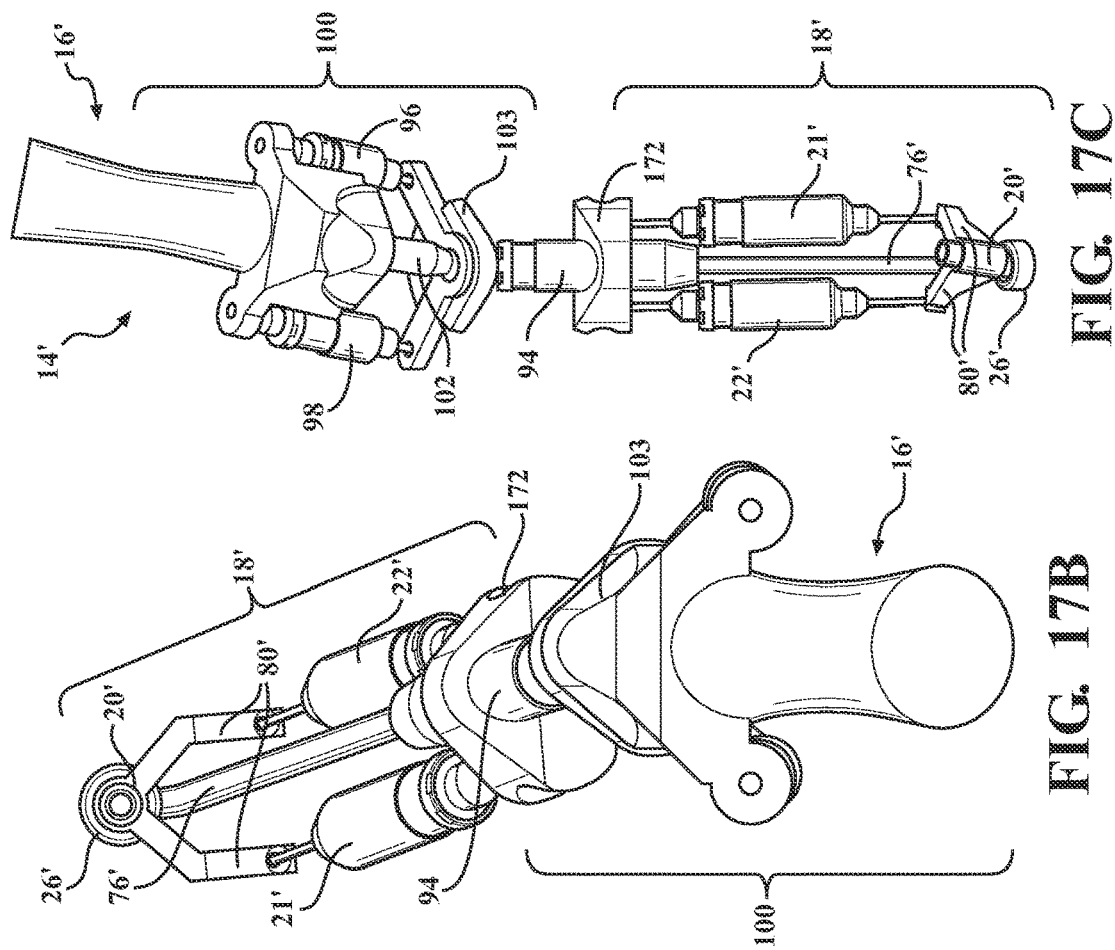
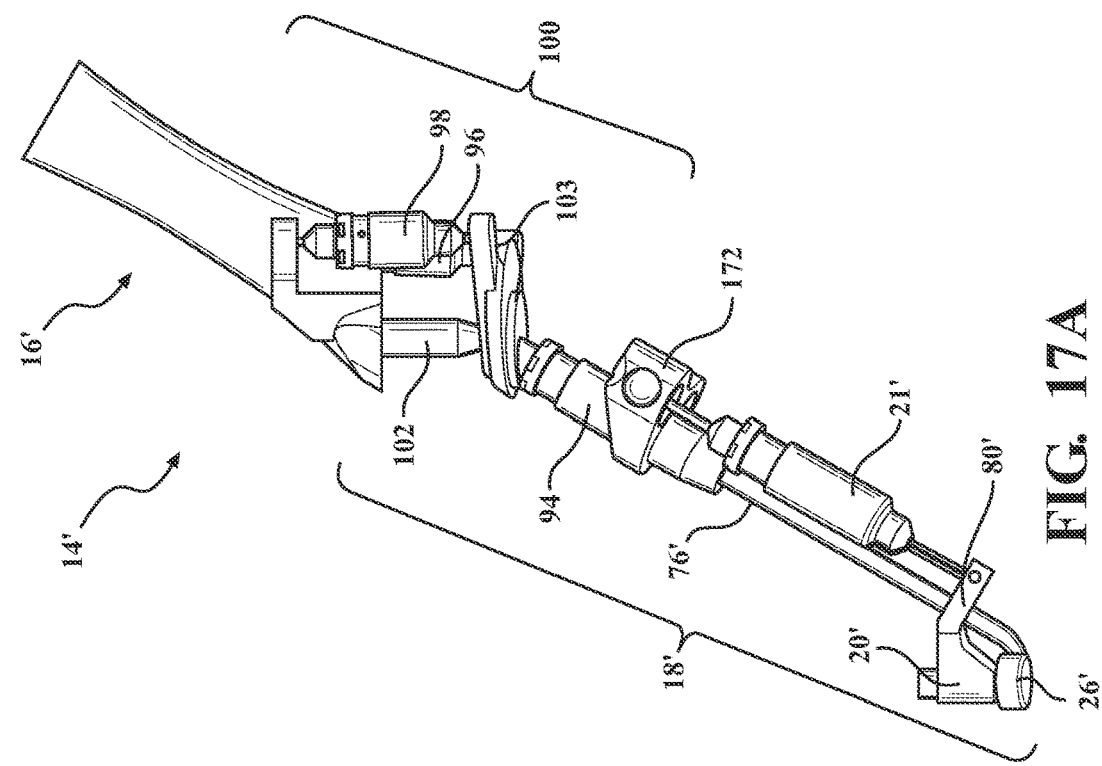
FIG. 17C
FIG. 17B
FIG. 17A

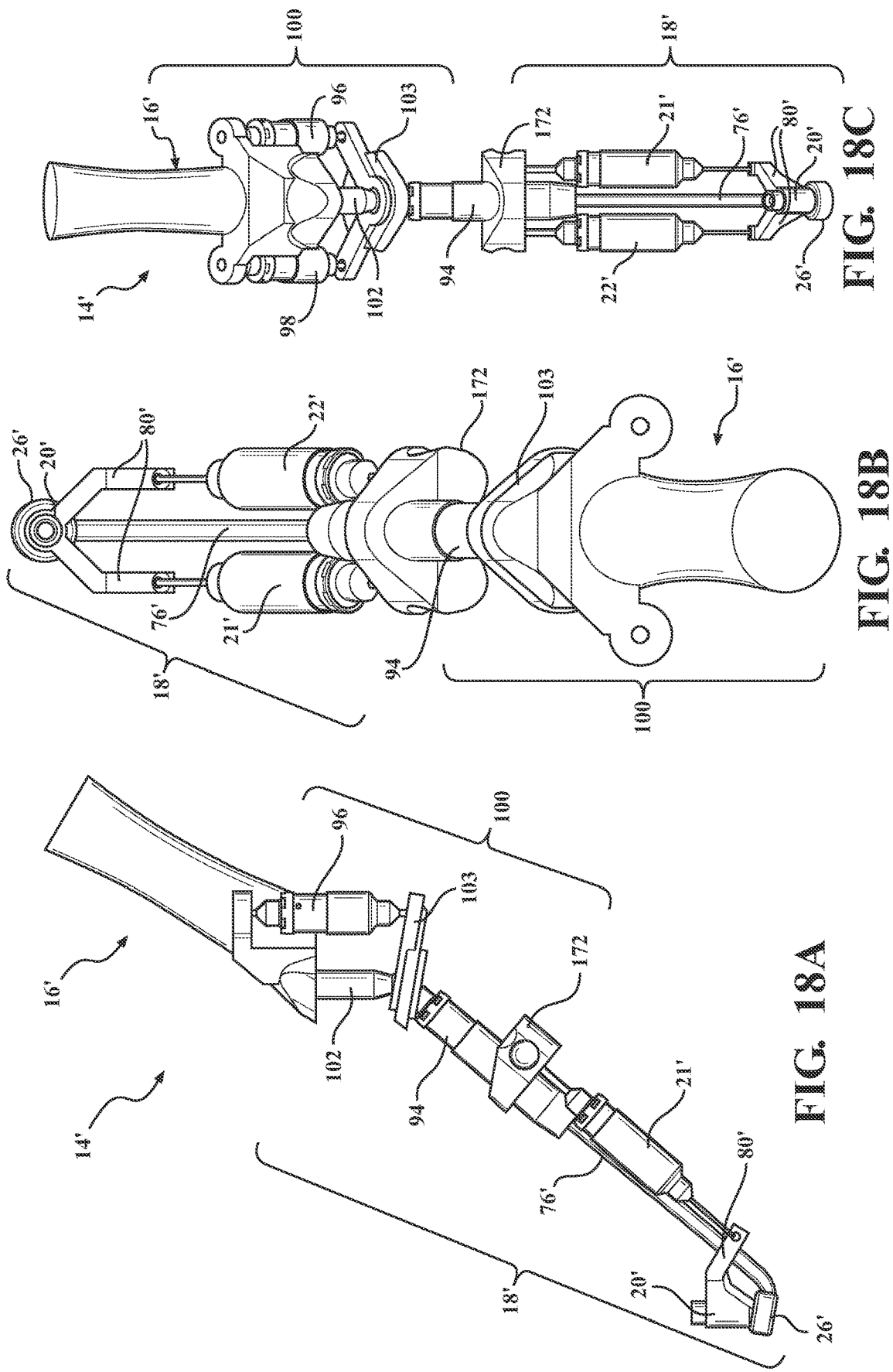

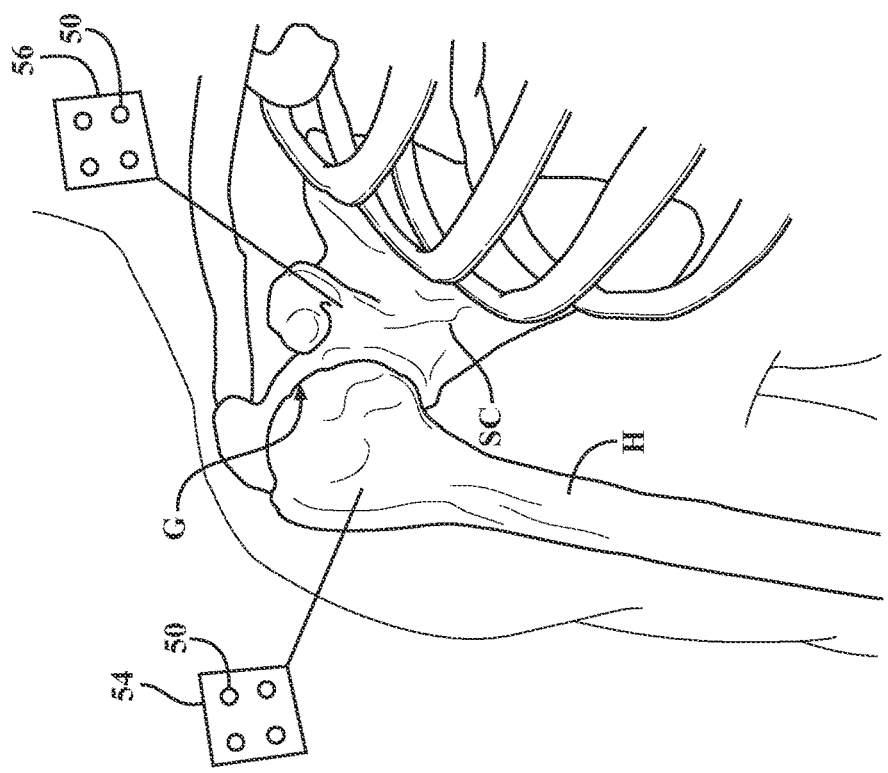
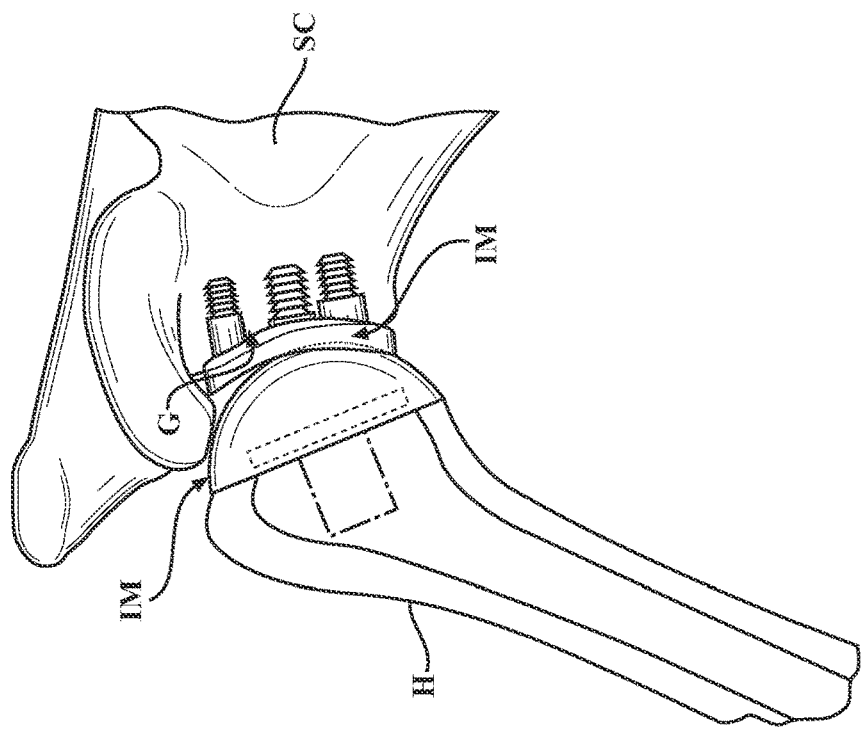
FIG. 20A
FIG. 20B

ROBOTIC HAND-HELD SURGICAL INSTRUMENT SYSTEMS AND METHODS

CROSS-REFERENCE TO RELATED APPLICATIONS

The subject patent application is a national phase of PCT International Application No. PCT/US2021/058249, filed on Nov. 5, 2021, which claims priority to and all the benefits of U.S. Provisional Patent Application No. 63/110,685, filed on Nov. 6, 2020, the entire contents of which are incorporated by reference herein.

TECHNICAL FIELD

The present disclosure relates generally to surgical robotic hand-held instrument systems and methods of use.

BACKGROUND

Physical guides are often used to constrain surgical tools when drilling holes or placing screws. In some cases, physical guides constrain such surgical tools for the purpose of preparing joints to accept replacement implants. The time required to position and secure a physical guide to the patient can represent a significant portion of the overall time required to perform a surgical procedure.

Navigation systems (also referred to as tracking systems) can be used to properly align and secure jigs, as well as track a position and/or orientation of a surgical tool used to drill holes. Tracking systems typically employ one or more trackers associated with the tool and the tissue being drilled. A display can then be viewed by a user to determine a current position of the tool relative to a desired trajectory. The display may be arranged in a manner that requires the user to look away from the surgical site to visualize the tool's progress. This can distract the user from focusing on the surgical site. Also, it may be difficult for the user to place the tool in a desired manner.

Robotically assisted surgery typically relies on large robots with robotic arms that can move in six degrees of freedom (DOE). These large robots may be cumbersome to operate and maneuver in the operating room.

There is a need for systems and methods to address one or more of these challenges.

SUMMARY

One general aspect includes a hand-holdable body adapted to be freely holdable and moved by a hand of a user; and a trajectory assembly operatively connected with the hand-holdable body, the trajectory assembly including: a shaft extending from the hand-holdable body; a pivot frame coupled with the shaft. The trajectory assembly includes a guide member pivotally connected with the pivot frame; a support member outwardly extending from and connected with the guide member; two actuators coextending and substantially parallel to an axis of the shaft, each actuator pivotally connected with the support member. The trajectory assembly configured to convert linear movement of the actuators into pivotal movement of the guide member to adjust a trajectory axis, the actuators selectively configured to push and pull the support member connected with the guide member. The guide member is adjustable to a target trajectory with the actuators, adjusting the trajectory axis of the guide member in at least two degrees of freedom to align the trajectory axis with the target trajectory.

Implementations may include one or more of the following features. The guide member is configured to allow a surgical device to pass through during a surgical procedure. The pivot frame may include a recess along an inner surface of the pivot frame, a retainer is disposed within the recess, maintaining the guide member and pivot frame connection as the actuators adjust the guide member to the target trajectory. The pivot frame and the guide member may include a retention assembly, the retention assembly including a protrusion and a complimentary pocket. The retention assembly of the pivot frame may include a protrusion extending from the inner surface of the pivot frame, and the guide member may include a groove or pocket in an outer surface of the guide member that is complimentary to the protrusion. The retention assembly may restrict rotation of the guide member relative to the pivot frame, maintaining the target trajectory during actuation of the actuators. The actuators control pitch and roll of the guide member to align the guide member with the target trajectory.

The target trajectory may be set based on a surgical plan, such as planned implant location or may be set by a user, in accordance with a virtual boundary or object.

Another general aspect includes a robotically-assisted handholdable guide instrument. The robotically-assisted handholdable guide instrument also includes a hand-holdable body adapted to be freely held and moved by a hand of a user; a positioning assembly operatively connected to the hand-holdable body, the positioning assembly including a plurality of positioning actuators pivotally connected with the hand-holdable body; and a trajectory assembly operatively connected with the plurality of actuators of the positioning assembly, the trajectory assembly including: a shaft; a pivot frame connected with the shaft; a guide member pivotally connected with the pivot frame; a support member connected with the guide member; and two trajectory actuators pivotally connected to the support member. The instrument also includes where the plurality of positioning actuators operatively connect the positioning assembly with the trajectory assembly, the plurality of positioning actuators are configured to adjust a pose of the trajectory assembly in at least two degrees of freedom. The instrument also includes where trajectory assembly adjusts the guide member to a target trajectory with the trajectory actuators, adjusting a trajectory axis of the guide member in at least two degrees of freedom to align the trajectory axis with the target trajectory. Other embodiments of this aspect include corresponding computer systems, apparatus, and computer programs recorded on one or more computer storage devices, each configured to perform the actions of the methods.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

FIG. 10B is a cross sectional view of an actuator.

FIGS. 10C and 10D are perspective views of an actuator.

FIG. 10E is a partial cross section of the ball and socket connector in the hand-held portion.

FIGS. 15A and 15B display perspective views of the instrument of FIG. 14.

FIGS. 17A-17C display perspective views of the instrument of FIG. 14 in with a neutral trajectory and a left disposition.

FIGS. 18A-18C display perspective views of the instrument of FIG. 14 in with a neutral trajectory and a forward disposition.

FIGS. 20A and 20B are partial anatomical views of a patient before and after a shoulder implant procedure.

DETAILED DESCRIPTION

Overview

Figure 1:
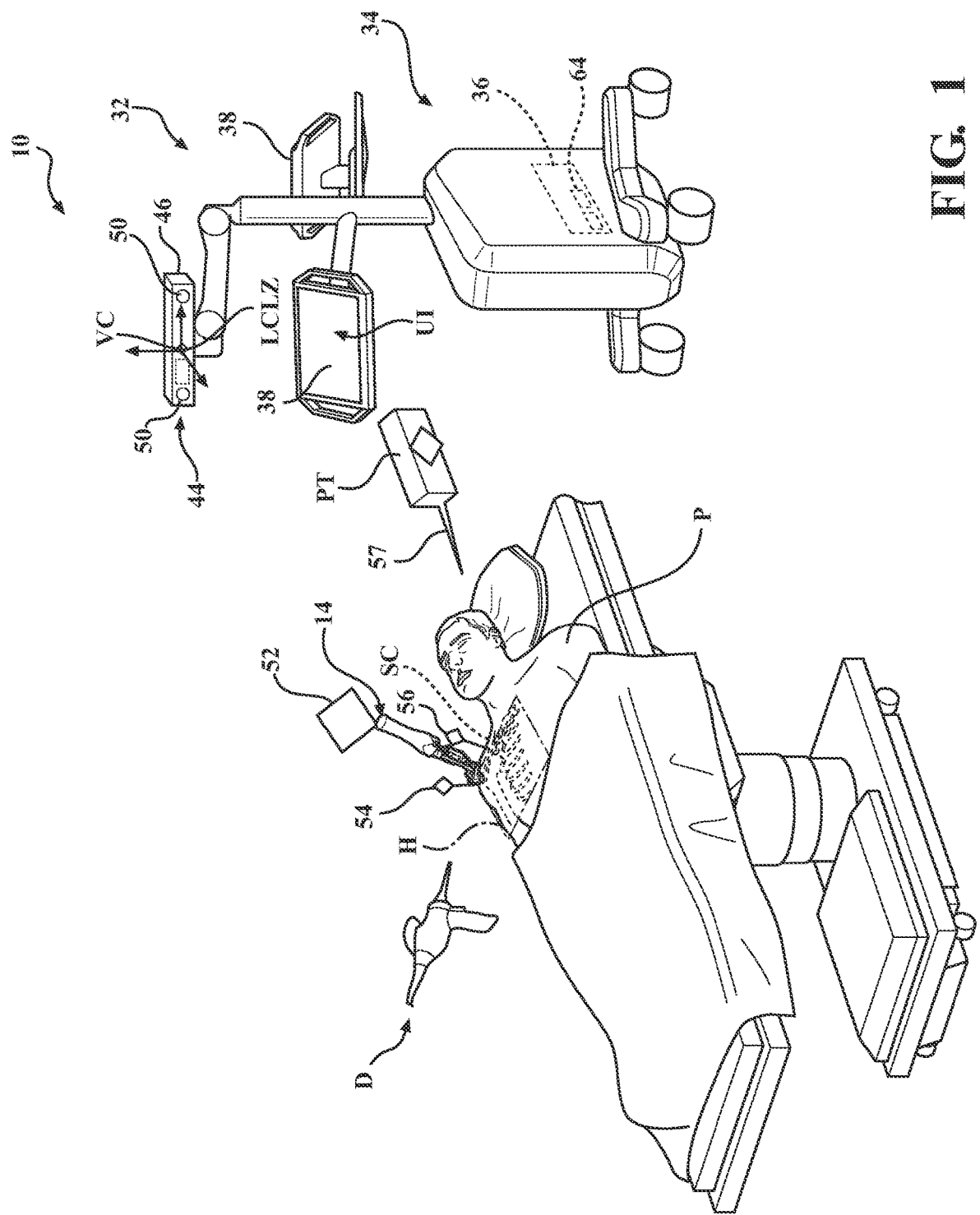
FIG. 1 is a perspective view of a robotic surgical system.

Referring to FIG. 1, a surgical system 10 is illustrated. The surgical system 10 is shown performing a shoulder procedure on a patient 12 to resect portions of the patient 12 so that the patient 12 can receive a shoulder joint implant IM. The surgical system 10 may be used to perform other types of surgical procedures, including procedures that involve guiding drills, screws, pins, or other forms of treatment. As seen in FIG. 1, the surgical system 10 is shown performing a shoulder surgery. In some examples, the surgical procedure involves knee surgery, hip surgery, spine surgery, and/or ankle surgery, and may involve removing tissue to be replaced by surgical implants, such as knee implants, hip implants, shoulder implants, spine implants, and/or ankle implants. The robotic system 10 and techniques disclosed herein may be used to perform other procedures, surgical or non-surgical, and may be used in industrial applications or other applications where robotic systems are utilized.

Referring to FIGS. 1, the surgical system 10 includes a robotic guide instrument 14. In some examples, a user manually holds and supports the guide instrument 14 (as shown in FIG. 1). As best shown in FIGS. 1, the instrument 14 comprises a hand-held portion 16 for being manually grasped and/or supported by the user.

The instrument 14 may be freely moved and supported by a user without the aid of a guide arm, e.g., configured to be held by a human user while guiding the placement of a pin, screw, and/or drill such that the weight of the tool is supported solely by a hand of the user during the procedure. Put another way, the instrument 14 may be configured to be held such that the user's hand is supporting the instrument 14 against the force of gravity. The instrument 14 may weigh 8 lbs. or less, 6 lbs. or less, 5 lbs. or less, or even 3 lbs. or less. The instrument 14 may have a weight corresponding to ANSFAAMI HE75:2009. The instrument 14 also comprises a trajectory assembly 18 for guiding the trajectory of a tool, such as a driver. The method for operating the instrument 14 may include a user suspending the weight of the instrument 14 without any assistance from a passive arm or robotic arm.

Figure 2:
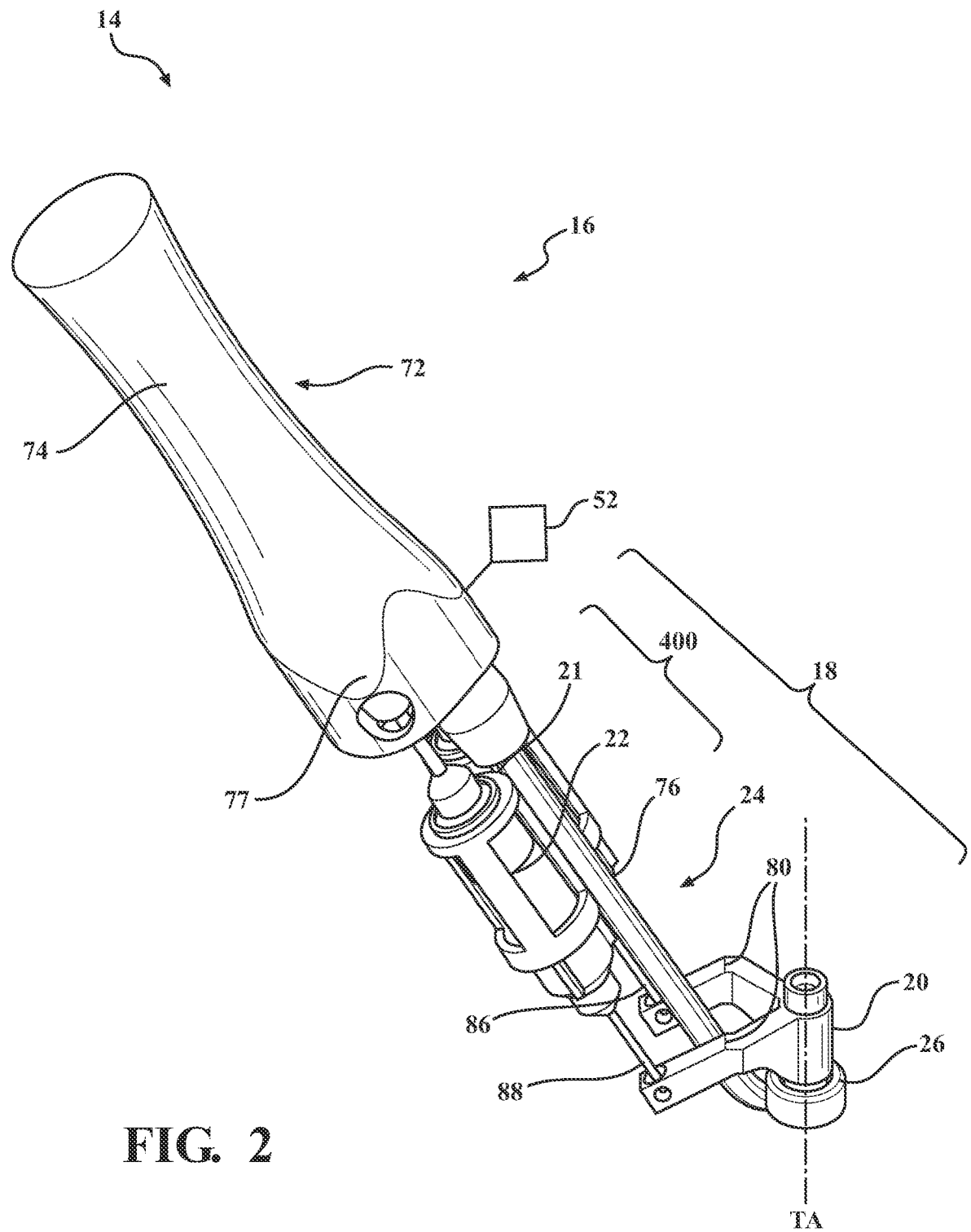
FIG. 2 is a perspective view of a robotic instrument.

Referring to FIG. 2, a guide member 20 couples to the hand-held portion 16 through the trajectory assembly 18 to align a trajectory of a surgical tool (such as a drill, screw, pin, driver, or the like) with the anatomy in certain operations of the surgical system 10 described further below. The guide member 20 may also be referred to as an end effector. The guide member may be configured as a conduit with an open passage disposed through the conduit. In some examples, the guide member 20 may be configured as a tube with a constant inner diameter. In other examples, the guide member may have a larger inner diameter at a first end of the conduit and a second smaller diameter at a second end. The opening may be of any suitable size or shape to accommodate a surgical instrument such as a drill, a screw, a pin, a needle, the like, or a combination thereof. In other examples, the guide member 20 may have any shape capable of allowing a surgical instrument and/or surgical retainer, such as a pin or screw, to be passed through. In other examples, the guide member 20 may have a shape such as a "U" or a "C". The guide member 20 is coupled with a pivot frame 26. The pivot frame 26 retains the guide member 20 while the guide member 20 is adjusted, constraining the guide member 20 to prevent rotation about the trajectory axis. In one example, the guide member 20 may be removable from the trajectory assembly 18 and pivot frame 26 such that new/different guide members 20 can be attached when needed. The guide member 20 may be designed to guide the trajectory of a driver or other surgical instrument into contact with the tissue of the patient 12. In some examples, the surgical instrument may be a drill, or a driver as shown in FIG. 1, or other type of accessory such as a biopsy needle. In other cases, the guide member may be replaced with a surgical tool. The surgical tool may be a drill, a driver, a tap, an ultrasonic instrument, a bur, a saw, or other cutting tool. In such instances, the robotic instrument would include a drive motor for the surgical tool.

An actuator assembly 400 comprising one or more actuators 21, 22, move the trajectory assembly 18 in two or more degrees of freedom relative to the hand-held portion 16 to provide robotic motion that assists in placing a surgical tool at a desired position and/or orientation (e.g., at a desired pose relative to the shoulder and/or spine during the surgical procedure), while the user manually holds the hand-held portion 16. The actuator assembly 400 may comprise actuators 21, 22, that are arranged in parallel, in series, or both. In one example seen in FIG. 2, the actuators 21, 22 are arranged in parallel. In some examples, the actuators 21, 22, move the trajectory assembly 18 in two or more degrees of freedom relative to the hand-held portion 16. In some examples, the actuator assembly 400 is configured to move the trajectory assembly 18 relative to the hand-held portion 16 in at least two degrees of freedom, such as pitch and roll. In some examples, such as shown herein, the actuators 21, 22, move the trajectory assembly 18 and its associated trajectory assembly coordinate system TCS in only two degrees of freedom relative to the hand-held portion 16 and its associated base coordinate system BCS. For example, the trajectory assembly 18 and its trajectory assembly coordinate system TCS may: rotate about its y-axis to provide pitch motion; and rotate about its x-axis to provide roll motion. It is contemplated to translate along an axis Z coincident with a z-axis of the base coordinate system BCS to provide z-axis translation motion. The allowed motions in pitch, roll, and z-axis translation are shown by arrows in FIG. 3 and in the schematic illustrations of FIGS. 4A-4B, 5A-5B, 6A-6B, 7A-7B, and 8A-8B, respectively. In some examples, actuators may move the trajectory assembly 18 in four or more degrees of freedom relative to the hand-held portion 16.

Referring back to FIG. 2, the constrain assembly 24 including a shaft 76 and a pivot frame 26 may be used to constrain movement of the trajectory assembly 18 relative to the hand-held portion 16 in the remaining degrees of freedom that are not controlled by the actuator assembly. The pivot frame 26 may comprise any suitable shape or configuration to constrain motion as described herein. In the example shown in FIG. 3, the pivot frame 26 operates to limit motion of the trajectory assembly coordinate system TCS by: constraining rotation about the z-axis of the base coordinate system BCS to constrain yaw motion; constraining translation in the x-axis direction of the base coordinate system BCS to constrain x-axis translation; and constraining translation in the y-axis direction of the base coordinate system BCS to constrain y-axis translation. The actuator assembly 400 and pivot frame 26, in certain situations described further below, are controlled to effectively control the trajectory of the instrument or device inserted through the guide tube, such as a drill or a pin driver.

Figure 9:
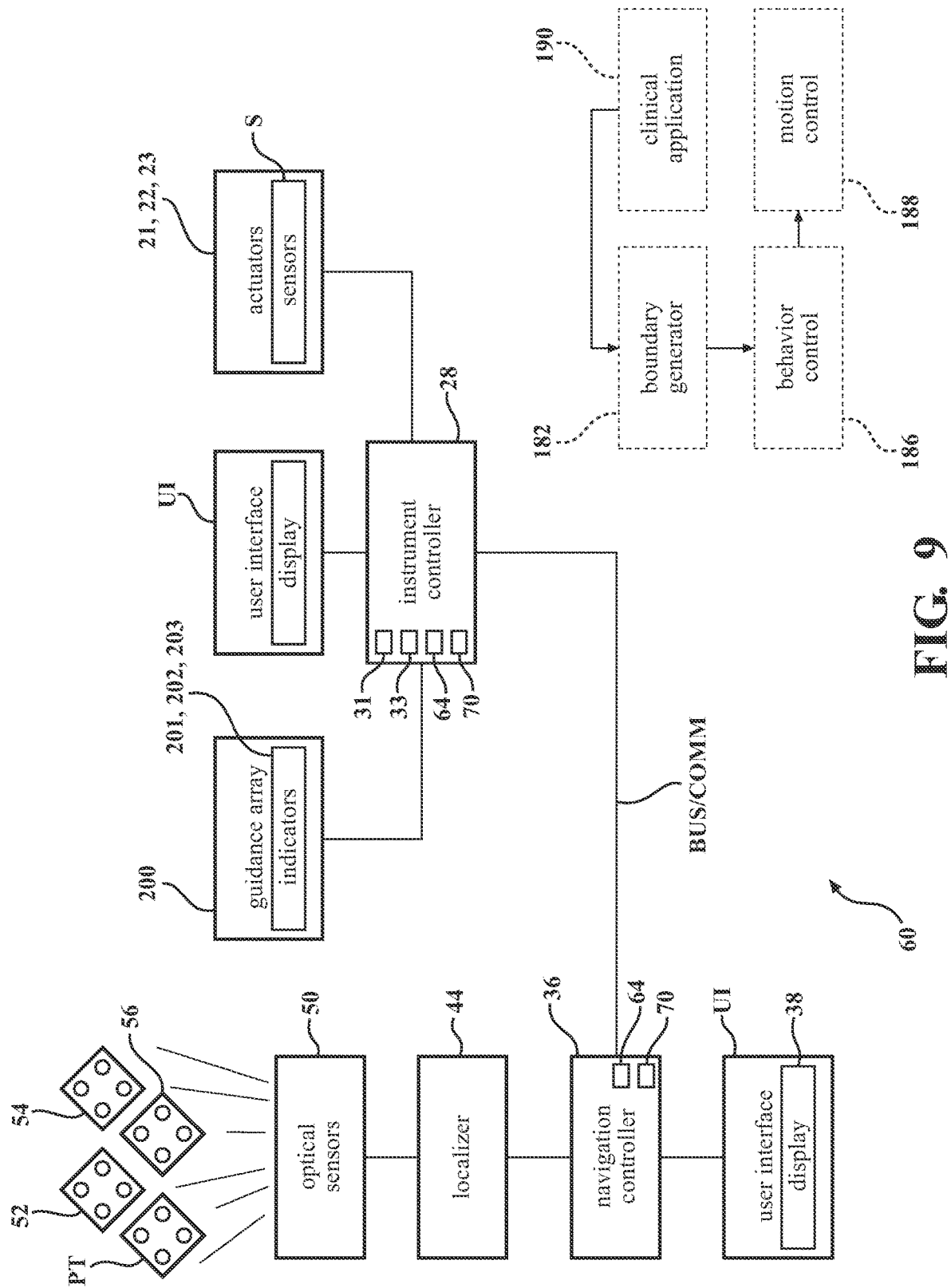
FIG. 9 a block diagram of a control system, and also illustrates various software modules.
Figure 10A:
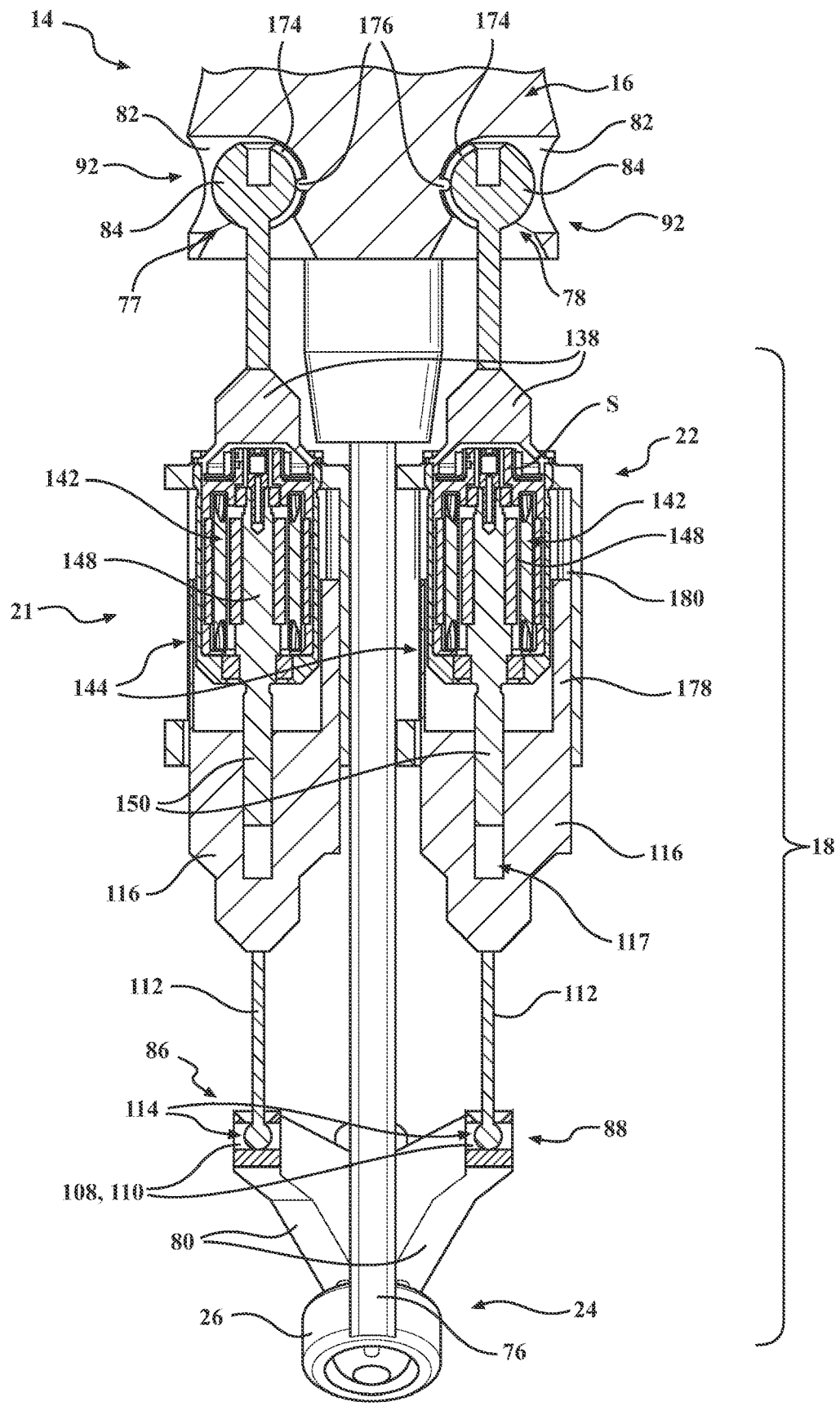
FIG. 10A is a partial cross-sectional view of the trajectory assembly.

Referring to FIG. 9, an instrument controller 28, or other type of control unit, is provided to control the instrument 14. The instrument controller 28 may comprise one or more computers, or any other suitable form of controller that directs operation of the instrument 14 and motion of the trajectory assembly 18 (and guide member 20) relative to the hand-held portion 16. The instrument controller 28 may have a central processing unit (CPU) and/or other processors, memory, and storage (not shown). The instrument controller 28 is loaded with software as described below. The processors could include one or more processors to control operation of the instrument 14. The processors can be any type of microprocessor, multi-processor, and/or multi-core processing system. The instrument controller 28 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor. The instrument 14 may also comprise a user interface UI with one or more displays and/or input devices (e.g., triggers, push buttons, foot switches, keyboard, mouse, microphone (voice-activation), gesture control devices, touchscreens, etc.).

The instrument controller 28 controls operation of the guide member 20. The instrument controller 28 controls a state (e.g., position and/or orientation) of the trajectory assembly 18 and the guide member 20 with respect to the hand-held portion 16. The instrument controller 28 can control velocity (linear or angular), acceleration, or other derivatives of motion of the guide member relative to the hand-held portion 16 and/or relative to the anatomy that is caused by the actuators 21, 22.

Figure 3:
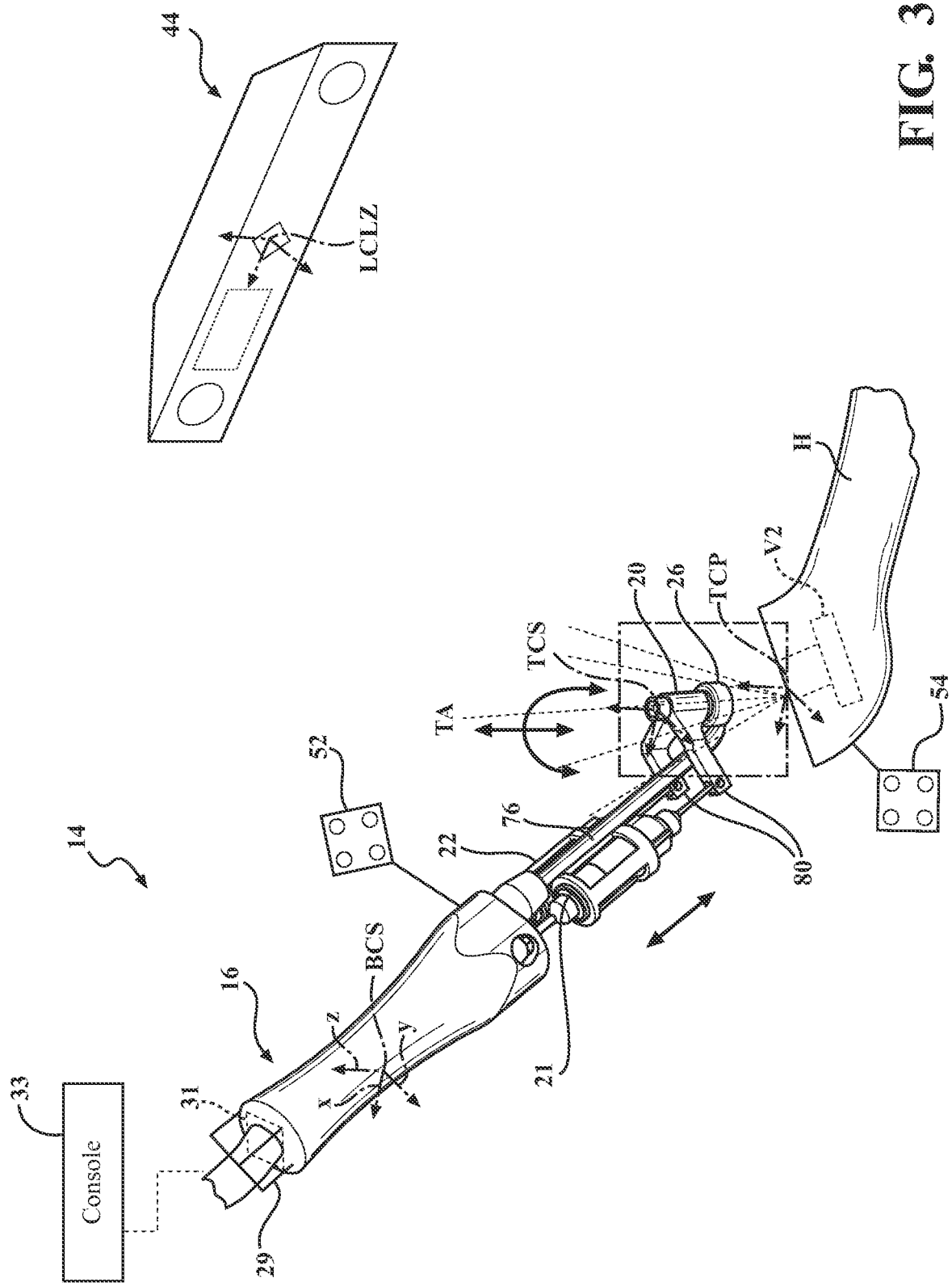
FIG. 3 is a perspective view of the robotic instrument adjusting trajectory.
Figure 4B:
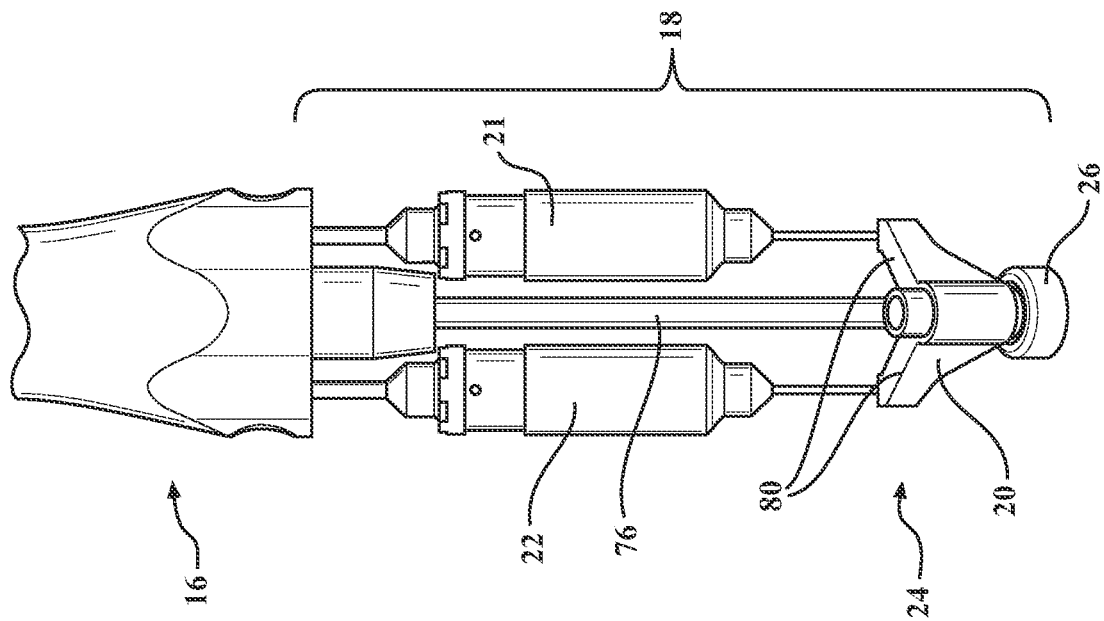
FIGS. 4A and 4B illustrate the robotic instrument in a neutral position.
Figure 4A:
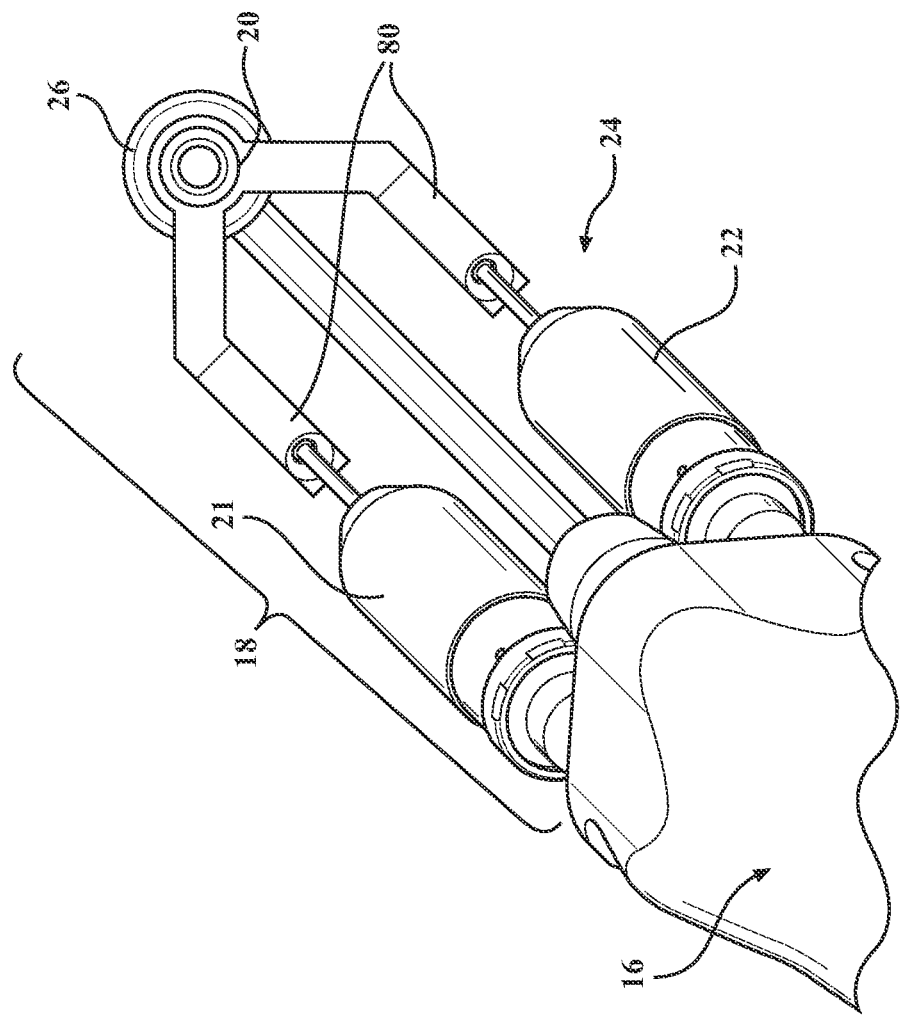
Figure 5B:
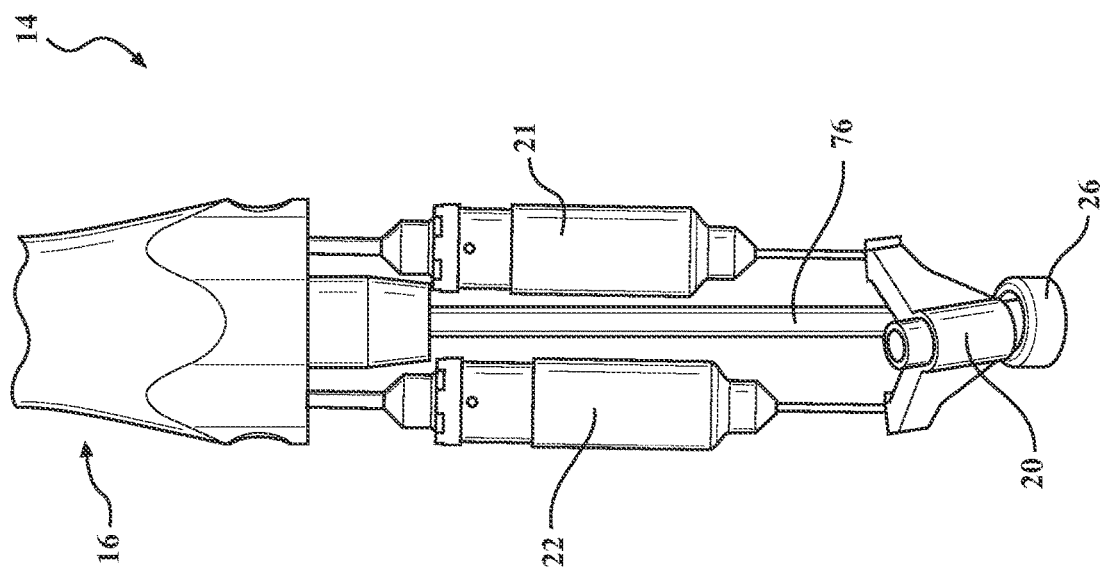
FIGS. 5A and 5B illustrate the robotic instrument in a right tilted position.
Figure 5A:
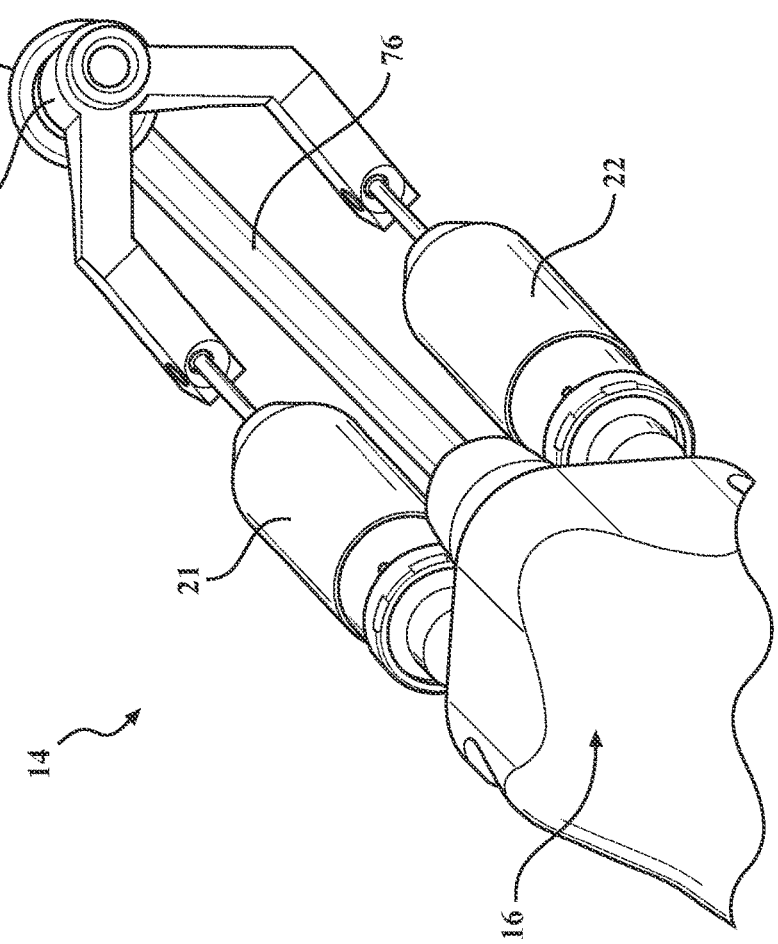
Figure 6B:
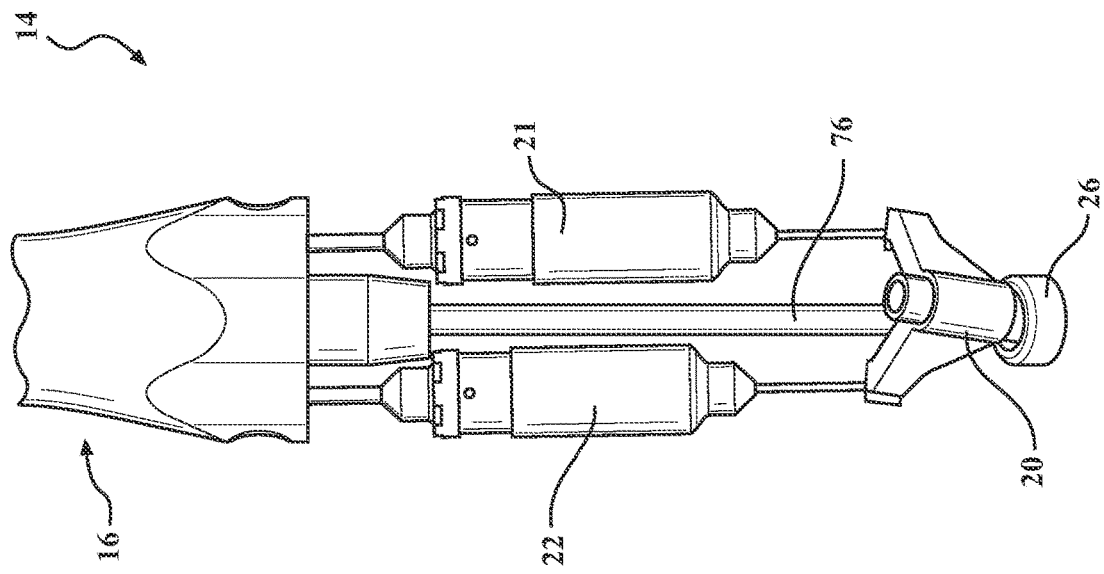
FIGS. 6A and 6B illustrate the robotic instrument in a left tilted position.
Figure 6A:
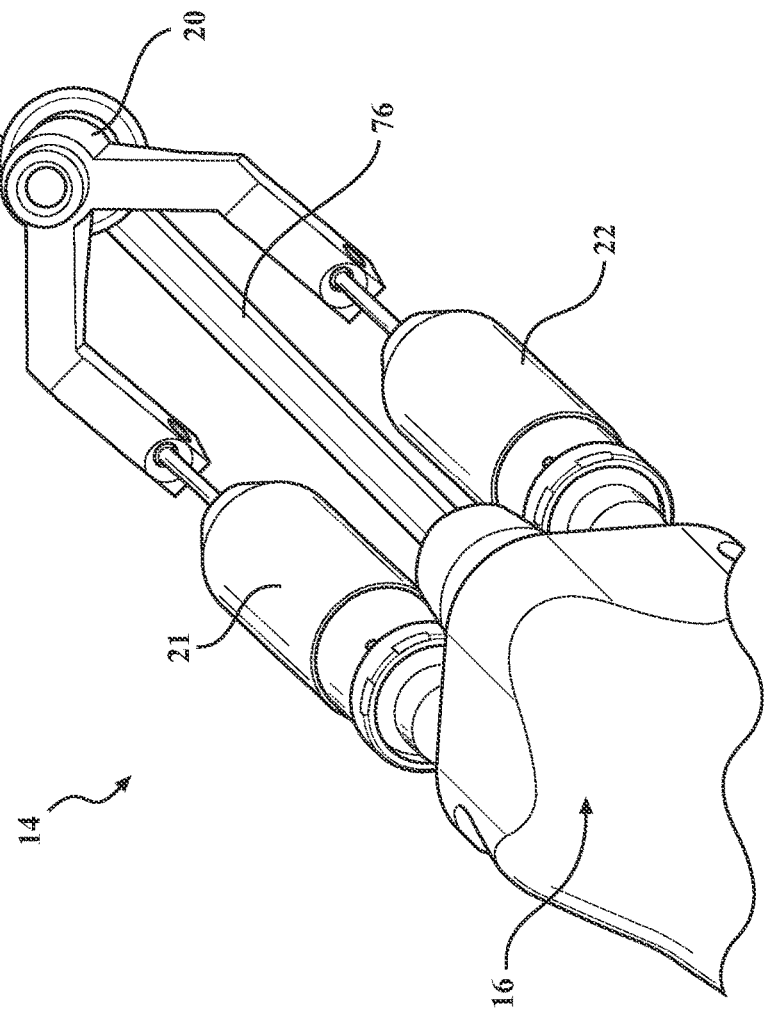
Figure 7B:
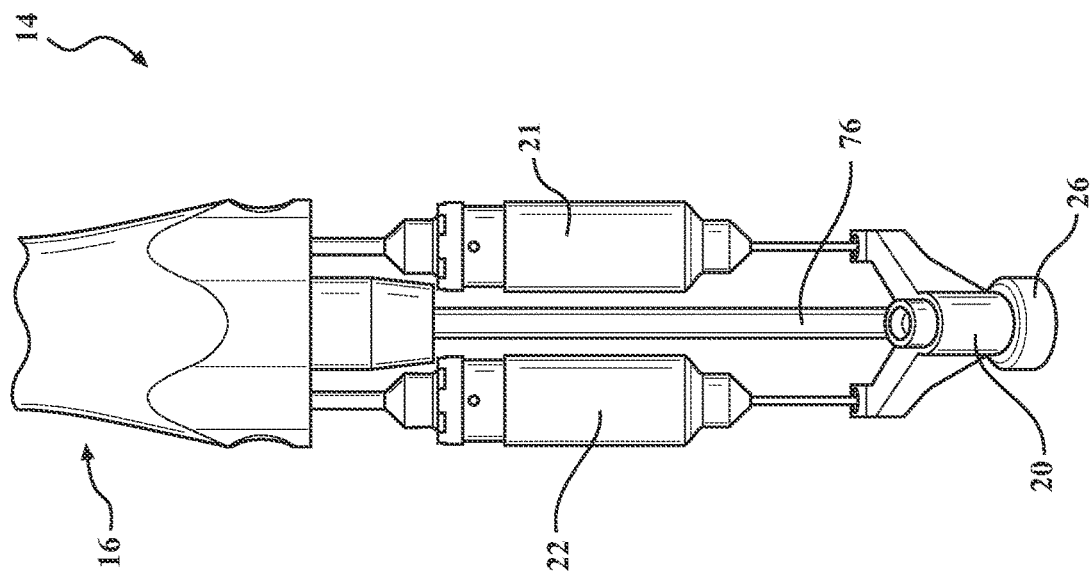
FIGS. 7A and 7B illustrate the robotic instrument in a forward tilted position.
Figure 7A:
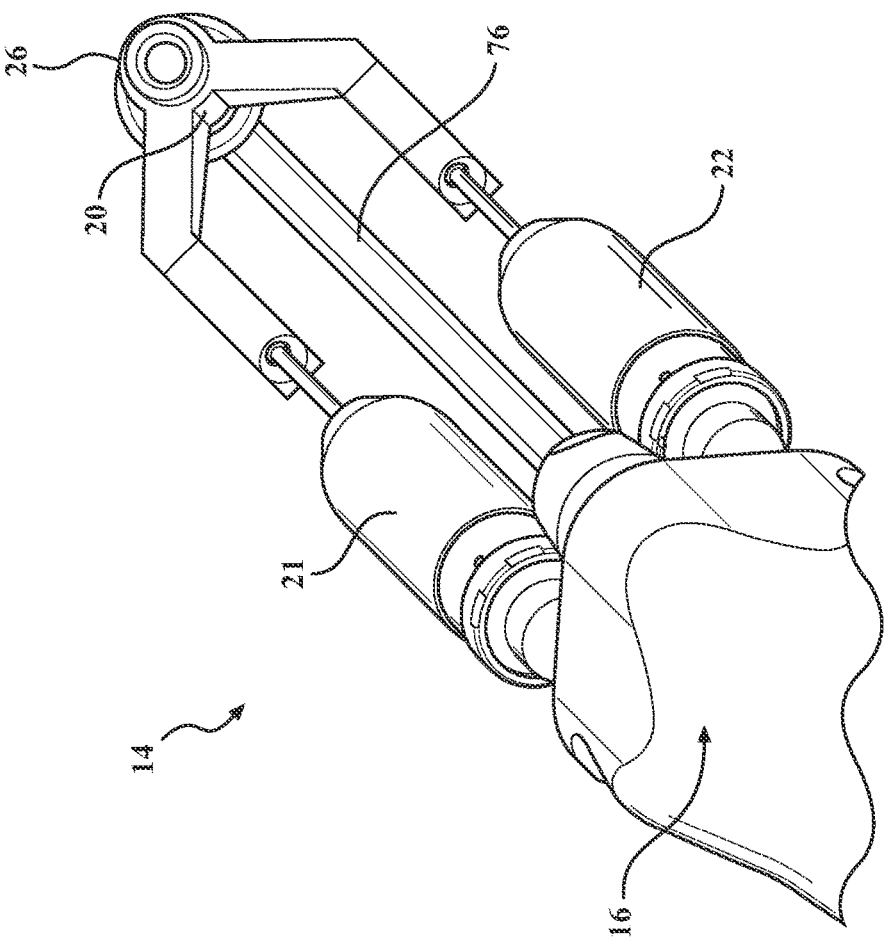
Figure 8B:
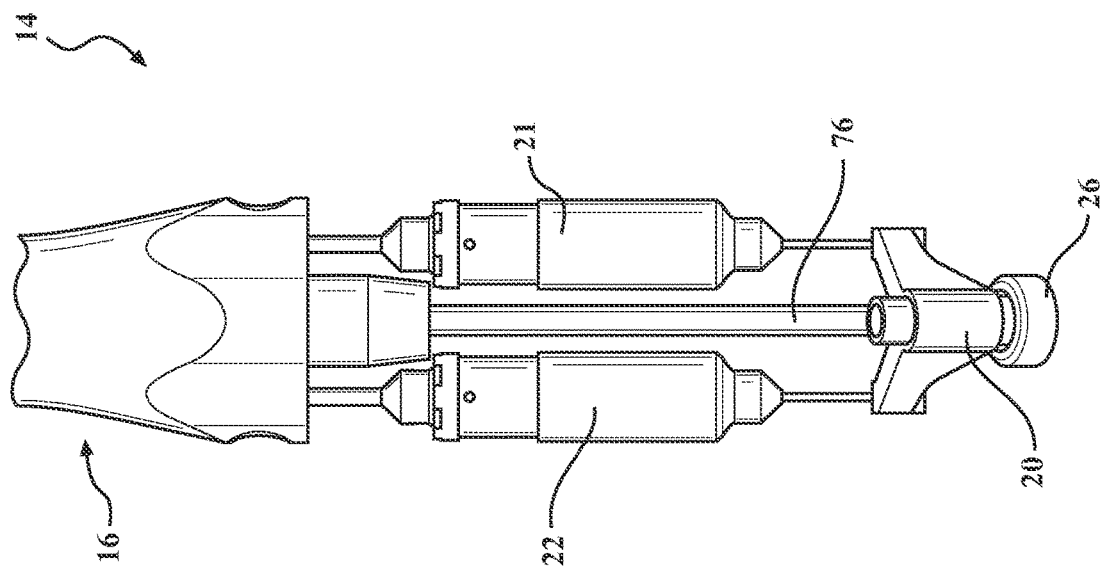
FIGS. 8A and 8B illustrate the robotic instrument in a rear tilted position.
Figure 8A:
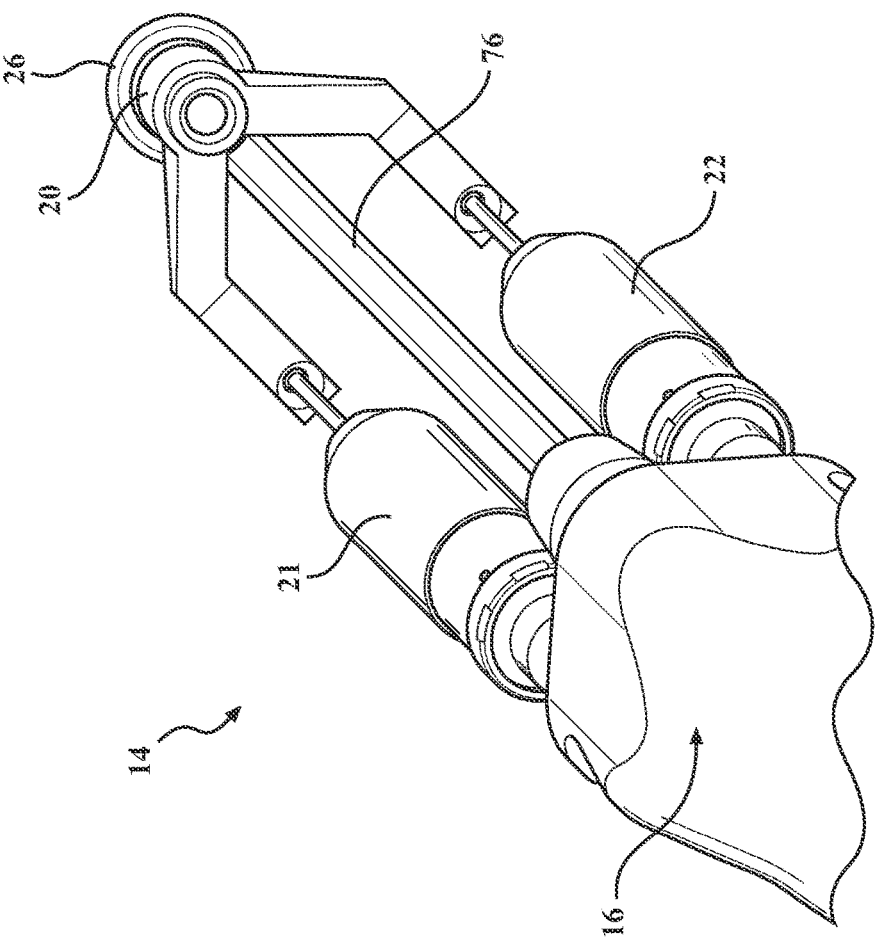

As shown in FIG. 3, the instrument controller 28 may comprise a control housing 29 mounted to the hand-held portion 16 with one or more control boards 31 (e.g., one or more printed circuit boards and associated electronic components) located inside the control housing 29. The control boards 31 may comprise microcontrollers, device drivers, memory, sensors, or other electronic components for controlling the actuators 21, 22, (e.g., via motor controllers). The instrument controller 28 may also comprise an off-board control console 33 in data and power communication with the control boards 31. The sensors S, and/or actuators 21, 22 described herein may feed signals to the control boards 31, which transmit data signals out to the console 33 for processing, and the console 33 may feed power and/or position commands back to the control boards 31 in order to power and control positioning of the actuators 21, 22. It is contemplated that the processing may also be performed on the control board(s) of the control housing. Of course, it is contemplated that no separate control housing is necessary.

In some versions, the console 33 may comprise a single console for powering and controlling the actuators 21, 22 (and/or actuators 94, 96, 98 described further below). In some versions, the console 33 may comprise one console for powering and controlling the actuators 21, 22. One such console for powering and controlling the drive motor M may be like that described in U.S. Pat. No. 7,422,582, filed on Sep. 30, 2004, entitled, "Control Console to which Powered Surgical Handpieces are Connected, the Console Configured to Simultaneously Energize more than one and less than all of the Handpieces," hereby incorporated herein by reference. Flexible circuits, also known as flex circuits, may interconnect the actuators 21, 22 and/or other components with the instrument controller 28. For example, flexible circuits FC may be provided between the actuators 21, 22, and the control boards 31. Other forms of connections, wired or wireless, may additionally, or alternatively, be present between components.

Referring briefly back to FIG. 1, the surgical system 10 further includes a navigation system 32. One example of the navigation system 32 is described in U.S. Pat. No. 9,008, 757, filed on Sep. 24, 2013, entitled, "Navigation System Including Optical and Non-Optical Sensors," hereby incorporated herein by reference. The navigation system 32 tracks movement of various objects. Such objects include, for example, the instrument 14, the guide member 20 and the anatomy, e.g., the spine and shoulder. The navigation system 32 tracks these objects to gather state information of each object with respect to a (navigation) localizer coordinate system LCLZ. As used herein, the state of an object includes, but is not limited to, data that defines the position and/or orientation of the tracked object (e.g., coordinate systems thereof) or equivalents/derivatives of the position and/or orientation. For example, the state may be a pose of the object, and/or may include linear velocity data, angular velocity data, and the like.

The navigation system 32 may include a cart assembly 34 that houses a navigation controller 36, and/or other types of control units. A navigation user interface UI is in operative communication with the navigation controller 36. The navigation user interface UI includes one or more displays 38. The navigation system 32 is capable of displaying graphical representations of the relative states of the tracked objects to the user using the one or more displays 38. The navigation user interface UI further comprises one or more input devices to input information into the navigation controller 36 or otherwise to select/control certain aspects of the navigation controller 36. Such input devices include interactive touchscreen displays. However, the input devices may include any one or more of push buttons, foot switches, a keyboard, a mouse, a microphone (voice-activation), gesture control devices, and the like.

The navigation system 32 also includes a navigation localizer 44 coupled to the navigation controller 36. In one example, the localizer 44 is an optical localizer and includes a camera unit 46. The camera unit 46 has an outer casing 48 that houses one or more optical sensors 50. The localizer 44 may comprise its own localizer controller 49 and may further comprise a video camera VC.

The navigation system 32 includes one or more trackers. In some examples, the trackers include a pointer tracker PT, a tool tracker 52, a first patient tracker 54, and a second patient tracker 56. In the illustrated example of FIG. 1, the tool tracker 52 is firmly attached to the instrument 14, the first patient tracker 54 is firmly affixed to the humerus H the patient 12, and the second patient tracker 56 is firmly affixed to the scapula SC of the patient 12. In this example, the patient trackers 54, 56 are firmly affixed to sections of bone. The pointer tracker PT is firmly affixed to a pointer 57 used for registering the anatomy to the localizer coordinate system LCLZ and/or used for other calibration and/or registration functions. It is contemplated that the patient trackers could be coupled to other locations of a patient other than components of the shoulder, such as one or more vertebra, skin, bones of the leg, hip, etc.

The tool tracker 52 may be affixed to any suitable component of the instrument 14, and in some versions may be attached to the hand-held portion 16, the trajectory assembly 18, directly to the guide member 20, or a combination thereof. The trackers 52, 54, 56, PT may be fixed to their respective components in any suitable manner, such as by fasteners, clamps, or the like. For example, the trackers 52, 54, 56, PT may be rigidly fixed, flexibly connected (optical fiber), or not physically connected at all (ultrasound), as long as there is a suitable (supplemental) way to determine the relationship (measurement) of that respective tracker to the associated object. Any one or more of the trackers 52, 54, 56, PT may include active markers. The active markers may include light emitting diodes (LEDs). Alternatively, the trackers 52, 54, 56, PT may have passive markers, such as reflectors, which reflect light emitted from the camera unit 46. Printed markers, or other suitable markers not specifically described herein, may also be utilized.

Various coordinate systems may be employed for purposes of tracking the objects. For instance, the coordinate systems may comprise the localizer coordinate system LCLZ, the trajectory assembly coordinate system TCS, the base coordinate system BCS, coordinate systems associated with each of the trackers 52, 54, 56, PT, one or more coordinate systems associated with the anatomy, one or more coordinate systems associated with pre-operative and/or intra-operative images (e.g., CT images, Mill images, etc.) and/or models (e.g., 2D or 3D models) of the anatomy, and a TCP (tool center point) coordinate system. Coordinates in the various coordinate systems may be transformed to other coordinate systems using transformations upon establishing relationships between the coordinate systems, e.g., via registration, calibration, geometric relationships, measuring, etc.

As shown in FIG. 3, in some examples, the TCP is a predetermined reference point or origin of the TCP coordinate system defined at the distal end of the guide member 20. The geometry of the guide member 20 may be defined relative to the TCP coordinate system and/or relative to the trajectory assembly coordinate system TCS. The guide member 20 may comprise one or more geometric features, e.g., perimeter, circumference, radius, diameter, width, length, height, volume, area, surface/plane, range of motion envelope (along any one or more axes), etc. defined relative to the TCP coordinate system and/or relative to the trajectory assembly coordinate system TCS and stored in the navigation system 32. In some examples, the guide member 20 has a trajectory (e.g., for placing screws) that will be described for convenience and ease of illustration, but is not intended to limit the guide member 20 to any particular form. Points, other primitives, meshes, other 3D models, etc., can be used to virtually represent the guide member 20. The TCP coordinate system, the trajectory assembly coordinate system TCS, and the coordinate system of the tool tracker 52 may be defined in various ways depending on the configuration of the guide member 20. For example, the pointer 57 may be used with calibration divots in the trajectory assembly 18 and/or in the guide member 20 for: determining (calibrating) a pose of the trajectory assembly coordinate system TCS relative to the coordinate system of the tool tracker 52; determining a pose of the TCP coordinate system relative to the coordinate system of the tool tracker 52; and/or determining a pose of the TCP coordinate system relative to the trajectory assembly coordinate system TCS. Other techniques could be used to measure the pose of the TCP coordinate system directly, such as by attaching and fixing one or more additional trackers/markers directly to the guide member 20. In some versions, trackers/markers may also be attached and fixed to the hand-held portion 16, the trajectory assembly 18, or both.

Since the trajectory assembly 18 is movable in multiple degrees of freedom relative to the hand-held portion 16 via the actuators 21, 22, the instrument 14 may employ encoders, hall-effect sensors (with analog or digital output), and/or any other position sensing method, to measure a pose of the TCP coordinate system and/or trajectory assembly coordinate system TCS relative to the base coordinate system BCS. The instrument 14 may use measurements from sensors that measure actuation of the actuators 21, 22 to determine a pose of the TCP coordinate system and/or trajectory assembly coordinate system TCS relative to the base coordinate system BCS, as described further below.

The localizer 44 monitors the trackers 52, 54, 56, PT (e.g., coordinate systems thereof) to determine a state of each of the trackers 52, 54, 56, PT, which correspond respectively to the state of the object respectively attached thereto. The localizer 44 may perform known triangulation techniques to determine the states of the trackers 52, 54, 56, PT, and associated objects. The localizer 44 provides the states of the trackers 52, 54, 56, PT to the navigation controller 36. In some examples, the navigation controller 36 determines and communicates the states of the trackers 52, 54, 56, PT to the instrument controller 28.

The navigation controller 36 may comprise one or more computers, or any other suitable form of controller. Navigation controller 36 has a central processing unit (CPU) and/or other processors, memory, and storage (not shown). The processors can be any type of processor, microprocessor or multi-processor system. The navigation controller 36 is loaded with software. The software, for example, converts the signals received from the localizer 44 into data representative of the position and/or orientation of the objects being tracked. The navigation controller 36 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor.

Although one example of the navigation system 32 is shown that employs triangulation techniques to determine object states, the navigation system 32 may have any other suitable configuration for tracking the instrument 14, guide member 20, and/or the patient 12. In another example, the navigation system 32 and/or localizer 44 are ultrasound-based. For example, the navigation system 32 may comprise an ultrasound imaging device coupled to the navigation controller 36. The ultrasound imaging device images any of the aforementioned objects, e.g., the instrument 14, the guide member 20, and/or the patient 12, and generates state signals to the navigation controller 36 based on the ultrasound images. The ultrasound images may be 2D, 3D, or a combination of both. The navigation controller 36 may process the images in near real-time to determine states of the objects. The ultrasound imaging device may have any suitable configuration and may be different than the camera unit 46 as shown in FIG. 1.

In another example, the navigation system 32 and/or localizer 44 are radio frequency (RF)-based. For example, the navigation system 32 may comprise an RF transceiver coupled to the navigation controller 36. The instrument 14, the guide member 20, and/or the patient 12 may comprise RF emitters or transponders attached thereto. The RF emitters or transponders may be passive or actively energized. The RF transceiver transmits an RF tracking signal and generates state signals to the navigation controller 36 based on RF signals received from the RF emitters. The navigation controller 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52, 54, 56, PT shown in FIG. 1.

In yet another example, the navigation system 32 and/or localizer 44 are electromagnetically based. For example, the navigation system 32 may comprise an EM transceiver coupled to the navigation controller 36. The instrument 14, the guide member 20, and/or the patient 12 may comprise EM components attached thereto, such as any suitable magnetic tracker, electro-magnetic tracker, inductive tracker, or the like. The trackers may be passive or actively energized. The EM transceiver generates an EM field and generates state signals to the navigation controller 36 based upon EM signals received from the trackers. The navigation controller 36 may analyze the received EM signals to associate relative states thereto. Again, such navigation system 32 examples may have structural configurations that are different than the navigation system 32 configuration shown in FIG. 1.

The navigation system 32 may have any other suitable components or structure not specifically recited herein. Furthermore, any of the techniques, methods, and/or components described above with respect to the navigation system 32 shown may be implemented or provided for any of the other examples of the navigation system 32 described herein. For example, the navigation system 32 may utilize solely inertial tracking or any combination of tracking techniques, and may additionally or alternatively comprise, fiber optic-based tracking, machine-vision tracking, and the like.

Referring to FIG. 9, the surgical system 10 includes a control system 60 that comprises, among other components, the instrument controller 28 and the navigation controller 36. The control system 60 further includes one or more software programs and software modules. The software modules may be part of the program or programs that operate on the instrument controller 28, navigation controller 36, or a combination thereof, to process data to assist with control of the robotic system 10. The software programs and/or modules include computer readable instructions stored in memory 64 on the instrument controller 28, navigation controller 36, or a combination thereof, to be executed by one or more processors 70 of the controllers 28, 36. The memory 64 may be any suitable configuration of memory, such as non-transitory memory, RAM, non-volatile memory, etc., and may be implemented locally or from a remote database. Additionally, software modules for prompting and/or communicating with the user may form part of the program or programs and may include instructions stored in memory 64 on the instrument controller 28, navigation controller 36, or a combination thereof. The user may interact with any of the input devices of the navigation user interface UI or other user interface UI to communicate with the software modules. The user interface software may run on a separate device from the instrument controller 28 and/or navigation controller 36. The instrument 14 may communicate with the instrument controller 28 via a power/data connection. The power/data connection may provide a path for the input and output used to control the instrument 14 based on the position and orientation data generated by the navigation system 32 and transmitted to the instrument controller 28.

The control system 60 may comprise any suitable configuration of input, output, and processing devices suitable for carrying out the functions and methods described herein. The control system 60 may comprise the instrument controller 28, the navigation controller 36, or a combination thereof, and/or may comprise only one of these controllers, or additional controllers. The controllers may communicate via a wired bus or communication network as shown in FIG. 9, via wireless communication, or otherwise. The control system 60 may also be referred to as a controller. The control system 60 may comprise one or more microcontrollers, field programmable gate arrays, systems on a chip, discrete circuitry, sensors, displays, user interfaces, indicators, and/or other suitable hardware, software, or firmware that is capable of carrying out the functions described herein.

Instrument

In one exemplary configuration, the instrument 14 is best shown in FIGS. 10-13C. The instrument 14 includes the hand-held portion 16 to be held by the user, the trajectory assembly 18 movably coupled to the hand-held portion 16 to support the guide member 20, the actuator assembly 400 with the plurality of actuators 21, 22 operatively interconnecting the trajectory assembly 18 and the hand-held portion 16 to move the trajectory assembly 18 in two degrees of freedom relative to the hand-held portion 16, and the constraint assembly 24 having the pivot frame 26 operatively interconnecting the trajectory assembly 18 and the hand-held portion 16.

The hand-held portion 16 comprises a grip 72 for being grasped by the user so that the user is able to manually support the instrument 14. The hand-held portion 16 may be configured with ergonomic features such as a grip for a hand of a user to hold, a textured or mixed material coating for preventing a user's hand from slipping when wet and/or bloody. The hand-held portion 16 may include a taper to accommodate users with different hand sizes and contoured to mate with the contours of a user's hand and/or fingers. The hand-held portion 16 also comprises a base 74 to which the grip 72 is attached by one or more fasteners, adhesive, welding, or the like. The actuators 21, 22 may be movably coupled to the base 74 at the joint supports 77, 78 via joints described further below.

Figure 11A:
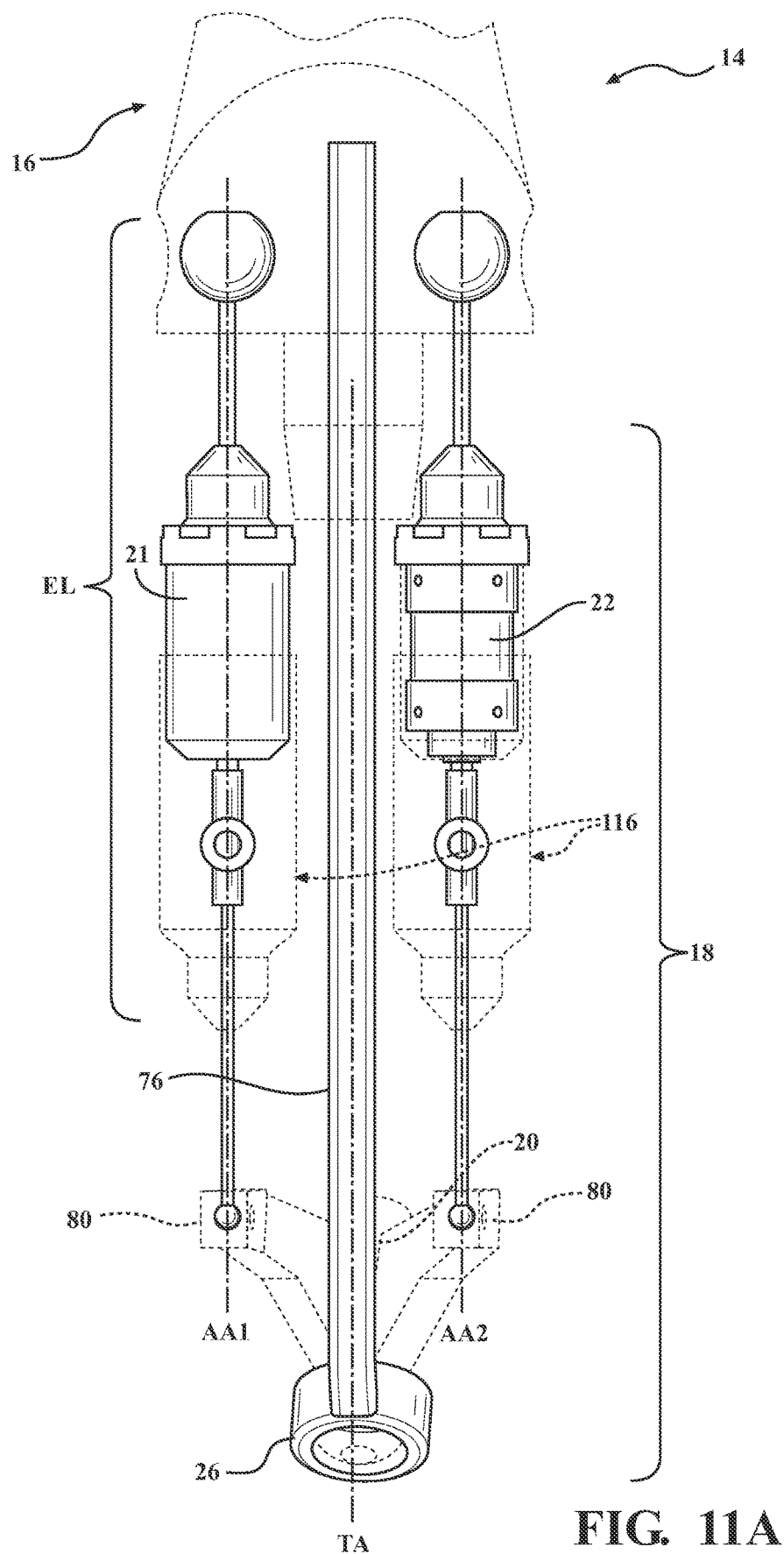
FIG. 11 is a rear perspective view of the trajectory actuators.

As best shown in FIGS. 2, 10, and 11, the trajectory assembly 18, particularly the guide member 20, comprises control arms 80. Each control arm 80 including an actuator mount 86, 88 at which the actuators 21, 22 are to be movably coupled to the control arms 80 of the guide member 20 via joints, as described further below. The actuator mounts 86, 88, may comprise brackets, or the like, suitable to mount the actuators 21, 22 such that the trajectory assembly 18 is able to move in at least two degrees of freedom relative to the hand-held portion 16.

The actuators 21, 22, in the version shown, comprise electric, linear actuators that extend between the base 74 and the control arms 80 of the guide member 20. When actuated, an effective length of the actuator 21, 22 changes to vary a distance between the guide member 20 and the base 74 of the hand-held portion 16 along a corresponding axis of the actuator 21, 22. Accordingly, the actuators 21, 22 work in concert to change their effective lengths and move the trajectory assembly 18 in at least two degrees of freedom relative to the hand-held portion 16. In the version shown, two actuators 21, 22 are provided, and may be referred to as first and second actuators 21, 22 or trajectory assembly actuators 21, 22. The first and second actuators 21, 22 are adjustable in effective length along a first active axis AA1 and a second active axis AA2 (see FIG. 11). The first and second actuators 21, 22 are independently adjustable in effective length to adjust one or more of a pitch orientation, a roll orientation, or both of the guide member 20 relative to the hand-held portion 16, as previously described. More actuators may be provided in some examples described further below. The actuators 21, 22 may comprise rotary actuators in some examples. The actuators 21, 22 may comprise linkages having one or more links of any suitable size or shape. The actuators 21, 22 may have any configuration suitable to enable movement of the guide member 20 relative to the hand-held portion 16 in at least two degrees of freedom.

In this version, the actuators 21, 22 are coupled to the base 74 and the control arms of the guide member 20 via a plurality of active joints. The active joints include a set of first active joints 92 that couple the actuators 21, 22 to the base 74 at the actuator mounts 77, 78. In one version, as shown in FIG. 10, the first active joints 92 comprises active spherical joints 81. The spherical joints 81 comprise a socket connector 82. The first socket connector 82 pivotally connects the actuator mounts 77, 78 with a spherical stud 84 of the actuators 21, 22. As a result, the actuators 21, 22 are able to move in at least two degrees of freedom relative to the base 74 of the hand-held portion 16. Other types of active joints are also contemplated, such as active joint blocks comprising U-joints that receive pins.

Referring to FIGS. 10, the active joints also comprise a set of second active joints 108 coupling the trajectory actuators 21, 22 to the control arms 80 of the guide member 20. In the version shown, the second active joints 108 are supported at the joint supports 86, 88. In one example, each of the second active joints 108 comprises a spherical joint 110 arranged to pivot relative to the control arms 80 of the guide member 20. Each spherical joint 110 has a ball stud 112 extending from the actuators 21, 22 to pivotally engage the socket mount 114 in each of the control arms 80 at one of the joint supports 86, 88 allowing the respective actuators 21, 22 to pivot within its respective joint support 77, 78 moving the guide member 20 relative to the hand-held portion 16.

Referring to FIG. 10, each of the actuators 21, 22 comprises a housing 134. The housing 134 comprises a canister 136 and a cap 138 threadably connected to the canister 136. The ball studs 84 that form part of the first active joints 92 are fixed to the housings 134 such that the housings 134 and ball studs 84 are able to move together relative to the hand-held portion 16 via the first active joints 92.

Each of the actuators 21, 22 also comprises a motor 142 disposed in each housing 134. The motor 142 has a casing 144 disposed in the housing 134 and a motor winding assembly 146 disposed within the casing 144. Each motor 142 also has a rotor 148 fixed to the lead screw 150. The lead screw 150 is supported for rotation in the housing 134 by one or more bushings and/or bearings 151. The rotor 148 and associated lead screw 150 are configured to rotate relative to the housing 134 upon selective energization of the motor 142. The lead screws 150 have fine pitch and lead angles to prevent backdriving (i.e., they are self-locking). As a result, a load placed on the trajectory assembly 18 does not easily back drive the motor 142. In some examples, the lead screws 150 have an 8-36 class 3 thread that results in a lead of from 0.02 to 0.03 inches/revolution. Other thread types/sizes may also be employed.

Each of the actuators 21, 22 may be controlled by a separate motor controller. Motor controllers may be wired separately to the actuators 21, 22, respectively, to individually direct each actuator 21, 22 to a given target position. In some examples, the motor controllers are proportional integral derivative (MD) controllers. In some examples, the motor controllers can be integrated with or form part of the instrument controller 28. For ease of illustration, the motor controllers shall be described herein as being part of the instrument controller 28.

A power source provides, for example, 32 VDC power signals to the motors 142 via the console 33. The 32 VDC signal is applied to the motors 142 through the instrument controller 28. The instrument controller 28 selectively provides the power signal to each motor 142 to selectively activate the motors 142. This selective activation of the motors 142 is what positions the guide member 20. The motors 142 may be any suitable type of motor, including brushless DC servomotors, other forms of DC motors, or the like. The power source also supplies power to the instrument controller 28 to energize the components internal to the instrument controller 28. It should be appreciated that the power source can provide other types of power signals such as, for example, 12 VDC, 24 VDC, 40 VDC, etc. Alternatively, the instrument may include a battery pack.

One or more sensors S (see also FIG. 10) transmit signals back to the instrument controller 28 so that the instrument controller 28 can determine a current position of the associated actuator 21, 22 (i.e., a measured position). The levels of these signals may vary as a function of the rotational position of the associated rotor 148. In one implementation, the sensor(s) S may resolve the rotational position of the rotor 148 within a given turn at a high resolution. These sensors S may be Hall-effect sensors that output analog and/or digital signals based on the sensed magnetic fields from the rotor 148, or from other magnets placed on the lead screw 150 (see, e.g., the 2-pole magnet MG in FIG. 10). A low voltage signal, e.g., 5 VDC, for energizing the Hall-effect sensors may be supplied from the motor controller associated with the motor 142 with which the Hall-effect sensors are associated. In some examples, two Hall-effect sensors are disposed in the housing 134 and spaced 90 degrees apart from each other around the rotor 148 to sense rotor position so that the instrument controller 28 is able to determine the position and count incremental turns of the rotor 148 (one such sensor S and magnets MG are shown in FIG. 10). In some versions, the Hall-effect sensors output digital signals representing incremental counts. Various types of motors and sensor arrangements are possible. In some examples, the motors 142 are brushless DC servomotors and two or more internal Hall-effect sensors may be spaced 90 degrees, 120 degrees, or any other suitable spacing from each other around the rotor 148. The sensors S may also comprise absolute or incremental encoders, which may be used to detect a rotational position of the rotor 148 and to count turns of the rotor 148. Other type of encoders may be also used as the one or more sensors. The sensors may be placed at any suitable location on the actuator and its surrounding components suitable to determine the position of each actuator as it is adjusted, such as on the housing, nut, screw, etc. In yet another configuration, sensorless motor control may be utilized. In such an implementation, the position of each rotor may be determined by measuring the motor's back-emf and/or inductance. One suitable example may be found in U.S. Pat. No. 7,422,582, which is hereby incorporated by reference in its entirety.

In some examples, output signals from the Hall-effect sensors are sent to the instrument controller 28. The instrument controller 28 monitors the received signals for changes in their levels. Based on these signals the instrument controller 28 determines rotor position. Rotor position may be considered the degrees of rotation of the rotor 148 from an initial or home position. The rotor 148 can undergo plural 360° rotations. The rotor position can therefore exceed 360°. A scalar value referred to as a count is representative of rotor position from the home position. The rotors 148 rotate in both clockwise and counterclockwise directions. Each time the signal levels of the plural signals (analog or digital) undergo a defined state change, the instrument controller 28 increments or decrements the count to indicate a change in rotor position. For every complete 360° rotation of the rotor 148, the instrument controller 28 increments or decrements the value of the count by a fixed number of counts. In some examples, the count is incremented or decremented between 100 and 3,000 per 360-degree revolution of the rotor 148. In some examples, there are 1,024 positions (counts) per 360-degree revolution of the rotor 148, such as when an incremental encoder is used to monitor rotor position. Internal to the instrument controller 28 is a counter associated with each actuator 21, 22. The counter stores a value equal to the cumulative number of counts incremented or decremented. The count value can be positive, zero or negative. In some versions, the count value defines incremental movement of the rotor 148. Accordingly, the rotors 148 of the actuators 21, 22 may first be moved to known positions, referred to as their home positions (described further below), with the count values being used thereafter to define the current positions of the rotors 148.

Each of the lead screws 150 are threadably connected with carriers 116. The carriers 116 have the internally threaded bores 117 to receive the lead screws 150 so that each of the lead screws 150 may translate a corresponding one of the carriers 116 to adjust the effective length of a corresponding one of the plurality of actuators 21, 22 and thereby vary the counts measured by the instrument controller 28. The lead screws 150 rotate allowing the carriers 116 to extend and contract relative to the hand-held portion 16 and the actuator motor 142. The carriers 116 are integrated into the ball stud 112 extending from each of the actuators 21, 22. Each of the housings 134 and corresponding carriers 116 are constrained from relative movement in at least one degree of freedom to allow the lead screws 150 to rotate relative to the carriers 116. In some examples, as shown in FIGS. 10A-10D, the carrier includes one or more rails 180 which are received in complimentary slots 180 in the actuator motor housing 134. The rails 180 and complimentary slots 178 allow the lead screws 150 to raise and lower the carriers 116 which are connected with the ball studs 112, effectively translating each carrier 116 in the longitudinal direction when actuated (i.e. see directional arrow in FIG. 10B). More specifically, the lead screws 150 are able to rotate relative to the carriers 116 owing to: the ball studs 84 being unable to rotate about the associated active axes AA1, AA2 (i.e., the ball studs 84 are limited from such rotational movement by virtue of the configuration of the first active joints 92, particularly retainer 176 within the socket mount 82 and complimentary groove 174 on ball stud 84—see FIGS. 10A, 10C, and 10E); and the carriers 116 being unable to rotate about the associated active axes AA1, AA2 (i.e., the carriers 116 are limited from such rotational movement by virtue of the configuration of the rails 180 and complimentary slots 178). In other examples, other methods of restraining rotational movement of the first active joint 92 and carriers 116 relative to the actuator motors 142 are contemplated.

As previously described, the actuators 21, 22 are actively adjustable in effective length to enable movement of the trajectory assembly 18 relative to the hand-held portion 16. One example of this effective length is labeled "EL" on t actuator 21 in FIG. 11. Here, the effective length EL is measured from a center of the associated carrier 116 to a center of the associated first active joint 92. As each actuator 21, 22 is adjusted, the effective length EL changes, by varying how far the lead screw 150 has been threaded into or out of its associated carrier 116 and thereby changing the distance from the center of the associated carrier 116 to the center of the associated first active joint 92. The actuators 21, 22 are adjustable between minimum and maximum values of the effective length EL. The effective length EL of each actuator 21, 22 can be represented/measured in any suitable manner to denote the distance between the guide member 20 and the hand-held portion 16 along the active axes AA1, AA2 that changes to cause various movements of the trajectory assembly 18 relative to the hand-held portion 16.

The constraint assembly 24 works in concert with the actuators 21, 22 to constrain the movement provided by the actuators 21, 22. The actuators 21, 22 provide movement in two degrees of freedom, while the constraint assembly 24 constrains movement in three degrees of freedom. In the version shown, the constraint assembly 24 comprises the pivot frame 26, as well as a shaft 76 that couples the pivot frame 26 to the base 74 of the hand-held portion 16. The shaft 76 operatively interconnects the pivot frame 26 and the hand-held portion 16 independently of the actuators 21, 22.

Figure 12A:
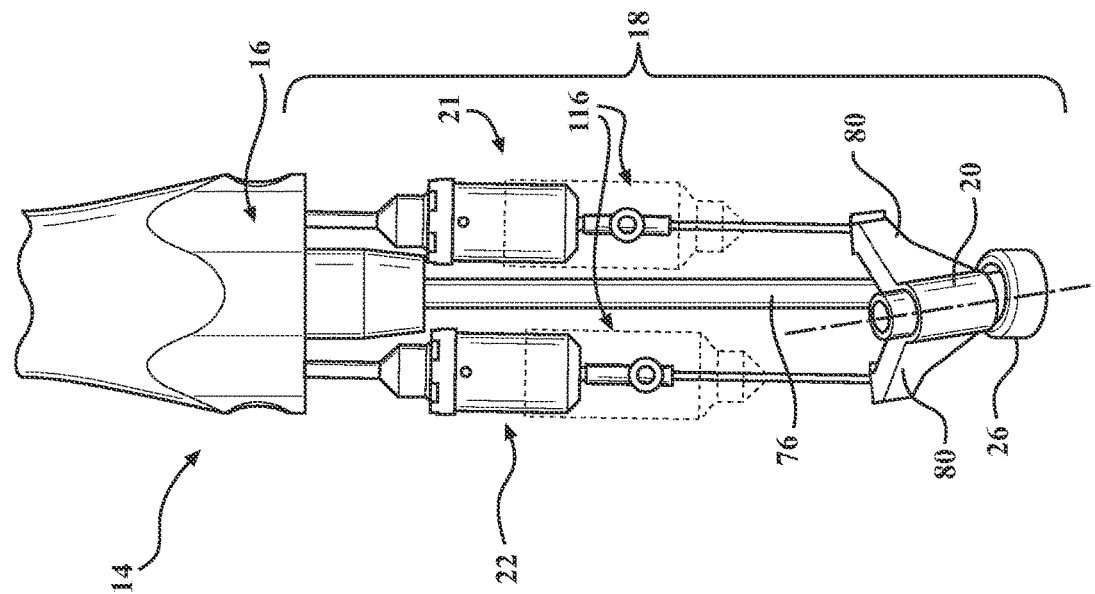
FIGS. 12A and 12B is a front perspective view of the trajectory assembly.
Figure 12B:
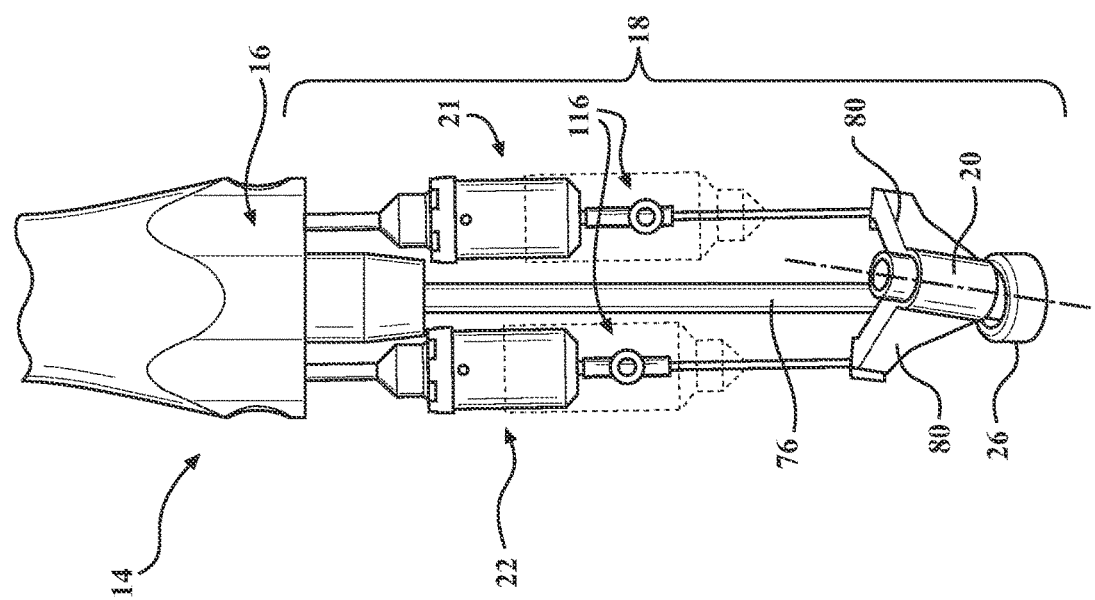

In one version, as shown in FIGS. 11 and 12A-12B, the actuators 21, 22 are displayed in different positions, showing the guide member 20 with different trajectories. In FIG. 11, the actuators 21 and 22 are shown at a center position resulting in the guide member 20 being centered within the pivot frame 26 with a trajectory perpendicular to a bottom surface of the pivot frame 26. FIGS. 12A and 12B show actuators 21, 22 moved into separate positions, adjusting the trajectory of the guide member 20. As each actuator is energized, the actuator motor 142 rotates the lead screw 150 within the carriers 116, pushing or pulling the ball studs 112, and subsequently the control arms 80, changing the trajectory of the guide member 20. The pivot frame 26 allows the guide member 20 to pivot while preventing rotation of the guide member 20. As a result, the guide member 20 is able to move in two degrees of freedom relative to the base 74 of the hand-held portion 16.

Figure 13B:
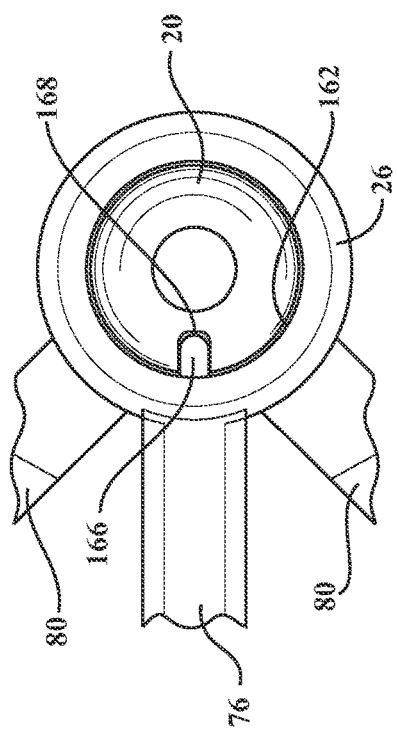
FIGS. 13A-13C are various views of the guide member and pivot frame.
Figure 13C:
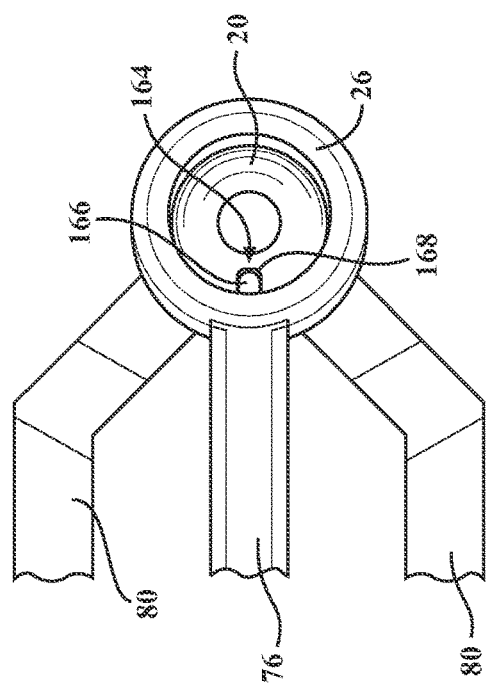
Figure 13A:
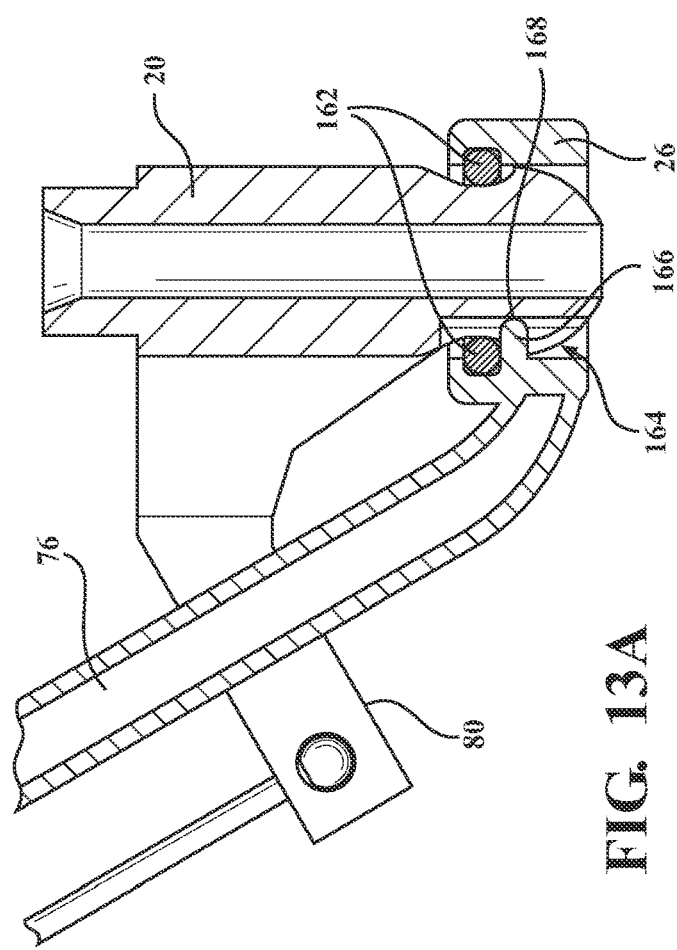

The guide member 20 pivots within the pivot frame 26 when the actuators 21, 22 are actuated. The guide member 20 is retained within the pivot frame 26 so that the guide member does not rotate about the trajectory axis TA while adjusting its trajectory. In one example, as shown in FIGS. 13A-13C, the guide member 20 is retained into a bore of the pivot frame 26 and retained by a deformable seal and an anti-rotation assembly. The anti-rotation assembly may also be called a retention assembly. In one example, the deformable seal may be an O-ring and the anti-rotation assembly may be a protrusion extending into the bore of the pivot frame 26 with a complimentary receiver on the outer surface of the guide member (i.e. a finger and groove arrangement). The outer surface of the guide member may be shaped to contact and receive the deformable seal and the anti-rotation assembly. However, any suitable features for retaining the guide member within the pivot frame and preventing unconstrained rotation about the trajectory axis are contemplated.

In the version shown, the actuators 21, 22 are arranged such that the active axes AA1, AA2 are in a parallel configuration in all positions of the actuators 21, 22, including when in their centered positions. Keeping the axes AA1, AA2 parallel generally keeps the actuator arrangement in a manner that allows for a slimmer base 74 and associated grip 72. Other configurations are contemplated, including those in which the active axes AA1, AA2 are in a canted configuration.

Further configurations of the actuators, active joints, and constraint assembly are possible. In some versions, the constraint assembly may be absent and the trajectory assembly 18 of the instrument 14 may be able to move in additional degrees of freedom relative to the hand-held portion 16. Furthermore, as mentioned above, the actuator assemblies described below may be used.

Alternative Configuration

Turning to FIGS. 14-19C, an alternative configuration of the instrument 14' is shown, including a positioning assembly 100 including a plurality of positioning actuators 94, 96, 98 operatively connected with the hand-held portion 16', the trajectory assembly 18', including the trajectory actuators 21', 22', the constraint assembly 24' with pivot frame 26', and guide member 20'. The positioning assembly 100 is configured to adjust a pose the trajectory assembly 18' in at least three degrees of freedom, while the trajectory assembly 18' is configured to adjust the guide member 20' to a target trajectory with the trajectory actuators 21', 22', adjusting the trajectory axis of the guide member in at least two degrees of freedom to align the trajectory axis TA with the target trajectory.

Figure 14:
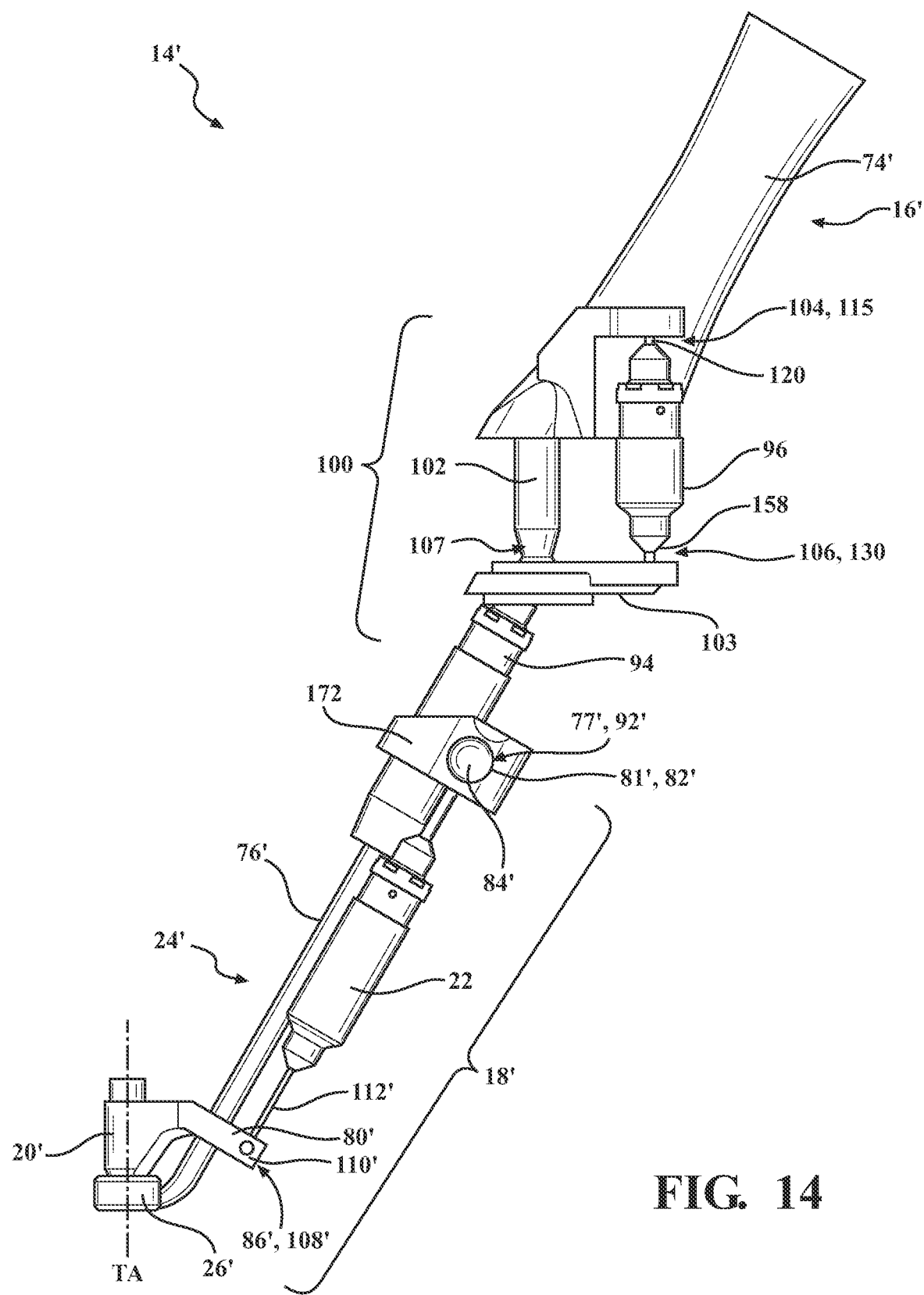
FIG. 14 is a perspective view of one embodiment of the instrument.

Turning to FIGS. 14 and 15A-15B, the instrument 14' includes the hand-held portion 16' to be held by the user. The hand-held portion 16' is the portion of the instrument 14' which a user holds and manually supports through gripping the hand-holdable body 16'. The hand-held portion 16' allows the user to move and manipulate the instrument 14' without constraint. The positioning assembly 100 is movably coupled to the hand-held body 16'. A first positioning actuator 96 and a second positioning actuator 98, along with a pivot member 102, are located between the hand-held portion 16' and an adjustment base 103, operatively interconnecting the hand-held portion 16' and the positioning assembly 100. The positioning actuators 96, 98 may be substantially similar in composition and function to the trajectory actuators 21, 22 described above with reference to FIGS. 10-12B. The positioning actuators 96, 98 may be configured to adjust pitch and roll of the trajectory assembly 18. The positioning actuators 96, 98 are connected to the hand-held portion 16' at active joints 104 and to the adjustment base 103 at active joints 106. The pivot member 102 is fixed to hand-held portion 16 and does not move relative to the hand-held portion 16'. Rather, the pivot member 102 is connected to the adjustment base 103 at active joint 107, configured as a ball-and-socket connection, the connection end of the pivot member 102 having the ball, and the adjustment plate 103 having the receiving socket.

The positioning actuators 96, 98, in the version shown, comprise electric, linear actuators that extend between the hand-held portion 16 and the adjustment plate. When actuated, an effective length of the actuator 96, 98 changes to vary a distance between the hand-held portion 16' and the adjustment plate 103 along a corresponding axis of the positioning actuators 96, 98 (FIGS. 15A-15B). Accordingly, the actuators 96, 98 work in concert to change their effective lengths and move the positioning assembly 100 in at least three degrees of freedom relative to the hand-held portion 16'. The positioning actuators 96, 98 are adjustable in effective length along a first active axis AA1' and a second active axis AA2' (see FIG. 15B). The first and second positioning actuators 96, 98 are independently adjustable in effective length to adjust one or more of a pitch orientation, and a roll orientation. The actuators 96, 98 may comprise rotary actuators in some examples. The actuators 96, 98 may comprise linkages having one or more links of any suitable size or shape. The positioning actuators 96, 98 may have any configuration suitable to enable movement of the positioning assembly 100 to move the trajectory assembly 18' relative to the hand-held portion 16' in at least three degrees of freedom.

In this version, the positioning actuators 96, 98 are coupled to the adjustment base 103 and the hand-held portion 16' via a plurality of active joints 104, 106. The active joints include a set of first active joints 104 that couple the actuators 96, 98 to the hand-held portion 16' at the actuator mounts 115. In one version, as shown in FIG. 14, the first active joints 104 comprises active spherical joints. The spherical joints comprise a socket connector 118. The socket connector 118 pivotally connects the actuator mounts 115 with a spherical stud 120 of the actuators 96, 98. As a result, the actuators 96, 98 are able to move the positioning assembly 100 (and subsequently the trajectory assembly 18) in at least three degrees of freedom relative to the hand-held portion 16. Other types of active joints are also contemplated, such as active joint blocks comprising U-joints that receive pins.

Referring to FIGS. 14, the active joints also comprise a set of second active joints 106 coupling the positioning actuators 96, 98 to the adjustment base 103. In the version shown, the second active joints 106 are supported at the joint supports 130. Each of the second active joints 106 comprises a spherical joint arranged to pivot relative to the adjustment base 103. Each spherical joint has a ball stud 158 extending from the actuators 96, 98 to pivotally engage the socket mount 160 in the adjustment base 103, allowing the respective actuators 96, 98 to pivot within the active joint 106 moving the positioning assembly 100 relative to the hand-held portion 16', changing the position of the trajectory assembly 18'.

As shown in FIGS. 15A-15B, the positioning actuators 96, 98 and the pivot member 102 are arranged in a parallel configuration, canted relative to the hand-held portion 16 and the longitudinal axis of the instrument 14. The positioning actuators 96, 98 and pivot member 102 are arranged in a generally triangular shape with the pivot member 102 in a forward position and the positioning actuators 96, 98 in rear positions. The positioning assembly further includes a translation actuator 94 arranged along the longitudinal axis of the instrument 14. The translation actuator 94 is connected with the adjustment base 103, opposite of the positioning actuators 96, 98 and pivot member 102. The translation actuator 94 may be configured to control the longitudinal translation of the trajectory assembly 18'.

The positioning assembly 100 is configured to move the trajectory assembly 18' in three degrees of freedom, changing the z-axis translation (longitudinal translation relative to the hand-held portion 16'), pitch, and roll relative to the hand-held portion 16'. The positioning assembly is connected to the trajectory assembly 18 through the translation actuator 94. The translation actuator is substantially similar to the positioning actuators 96, 98 and the trajectory actuators 21', 22', operating in a substantially similar fashion. The translation actuator 94 changes effective length EL along an active axis AA3 (FIGS. 15A-15B). The translation actuator 94 does not connect with an active joint, but rather is fixed between the positioning assembly and the trajectory assembly 18', translating the trajectory assembly 18' relative to the positioning assembly 100 and the hand-held portion 16'.

As best shown in FIGS. 14-19C, the trajectory assembly 18' comprises a trajectory base 133 which is operatively connected to the translation actuator 94 of the positioning assembly 100, as well as the constraint assembly 24' and trajectory actuators 21', 22'.

As described above, the trajectory actuators 21', 22', in the version shown, comprise electric, linear actuators that extend between the trajectory base and the control arms 80' of the guide member 20'. When actuated, an effective length of the actuator 21', 22' changes to vary a distance between the guide member 20' and a trajectory base 172 along a corresponding axis of the trajectory actuators 21', 22'. Accordingly, the actuators 21', 22' work in concert to change their effective lengths and move the trajectory assembly 18' in at least two degrees of freedom relative to the hand-held portion 16' and the positioning assembly. In the version shown, two trajectory actuators 21', 22' are provided, and may be referred to as first and second trajectory actuators 21', 22' or trajectory assembly actuators 21', 22'. The trajectory actuators 21', 22' are adjustable in effective length along active axis AA4 and active axis AA5 (see FIGS. 15A-15B). The first and second actuators 21', 22' are independently adjustable in effective length to adjust one or more of a pitch orientation and a roll orientation of the guide member 20' relative to the hand-held portion 16', as previously described. The actuators 21', 22' may comprise rotary actuators in some examples. The actuators 21', 22' may comprise linkages having one or more links of any suitable size or shape. The actuators 21', 22' may have any configuration suitable to enable movement of the guide member 20' relative to the hand-held portion 16' and the positioning assembly 100 in at least two degrees of freedom.

In this version, the trajectory actuators 21', 22' are coupled to the trajectory base 172 and the control arms 80' of the guide member 20' via a plurality of active joints. The active joints include a set of first active trajectory joints 92' that couple the actuators 21', 22' to the trajectory base 172 at the actuator mounts 77', 78'. In one version, as shown in FIG. 14, the first active joints 92' comprises active spherical joints 81'. The spherical joints 81' comprise a socket connector 82'. The first socket connector 82' pivotally connects the actuator mounts 77', 78' with a spherical stud 84' of the actuators 21', 22'. As a result, the actuators 21', 22' are able to move the guide member 20' in at least two degrees of freedom relative to the translation actuator 94 and positioning assembly 100. Other types of active joints are also contemplated, such as active joint blocks comprising U-joints that receive pins.

Referring to FIGS. 14, the active joints also comprise a set of second active joints 108' coupling the trajectory actuators 21', 22' to the control arms 80' of the guide member 20'. In the version shown, the second active joints 108' are supported at the joint supports 86', 88'. Each of the second active joints 108' comprises a spherical joint 110' arranged to pivot relative to the control arms 80' of the guide member 20'. Each spherical joint 110' has a ball stud 112' extending from the actuators 21', 22' to pivotally engage the socket mount 114' in each of the control arms 80' at one of the joint supports 86', 88' allowing the respective actuators 21', 22' to pivot within its respective joint support 77', 78' moving the guide member 20' relative to the hand-held portion 16' and positioning assembly 100.

The constraint assembly 24' works in concert with the trajectory actuators 21', 22' to constrain the movement of the guide member 20' provided by the actuators 21', 22'. The actuators 21', 22' provide movement in two degrees of freedom, while the constraint assembly 24' constrains movement in three degrees of freedom. In the version shown, the constraint assembly 24' comprises the pivot frame 26', as well as a shaft 76' that couples the pivot frame 26' to the base 74' of the hand-held portion 16'. The guide member 20' comprises control arms 80'. Each control arm 80' including an actuator mount 86', 88' at which the actuators 21', 22' are to be movably coupled to the control arms 80' of the guide member 20' via joints. The actuator mounts 86', 88', may comprise brackets, or the like, suitable to mount the actuators 21', 22' such that the trajectory assembly 18' is able to move in at least two degrees of freedom relative to the positioning assembly 100.

As shown in FIGS. 15A-19C, the actuators 21', 22', 94, 96, 98 are displayed in different positions, showing the positioning assembly 100 and trajectory assembly 18' in different positions. In FIG. 15A-16B, the actuators 21', 22', 94, 96, 98 are shown at a center position resulting in a neutral position of the instrument 14'. The guide member 20' is centered within the pivot frame 26' with a trajectory perpendicular to a bottom surface of the pivot frame 26'.

The guide member 20' pivots within the pivot frame 26' when the actuators 21', 22' are actuated. The guide member 20' is retained within the pivot frame 26' so that the guide member 20' does not rotate about the trajectory axis TA while adjusting its trajectory.

Referring back to FIGS. 13A-13C, the guide member 20 is retained into a bore of the pivot frame 26 and retained by a deformable seal 162 and an anti-rotation assembly 164. In one example, the deformable seal 162 may be an O-ring and the anti-rotation assembly 164 may include a protrusion 166 extending into the bore 170 of the pivot frame 26 with a complimentary receiver 168 on the outer surface of the guide member 20. The outer surface of the guide member may be shaped to contact and receive the deformable seal 162 and the anti-rotation assembly 164. However, any suitable features for retaining the guide member 20 within the pivot frame 26 and preventing rotation about the trajectory axis are contemplated.

In the version shown, the positioning actuators 96, 98 and the trajectory actuators 21', 22' are arranged such that the active axes AA1', AA2' and AA4, AA5 are in a parallel configuration, respectively, in all positions, including when in the actuators are in the centered position. Keeping the axes AA1', AA2' and AA4, AA5 parallel generally keeps the actuator arrangement in line and allows for a slimmer base 74'. Additionally, the configuration of the actuators 21', 22', 96, 98 allows for greater adjustment of the trajectory assembly 18' and guide member 20'.

Figure 16C:
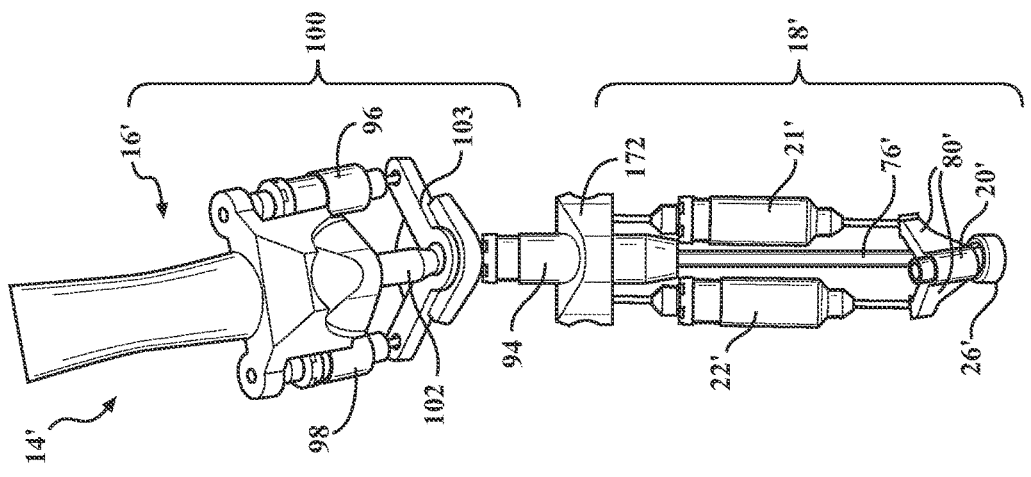
FIGS. 16A-16C display perspective views of the instrument of FIG. 14 with a neutral trajectory and a right disposition.
Figure 16B:
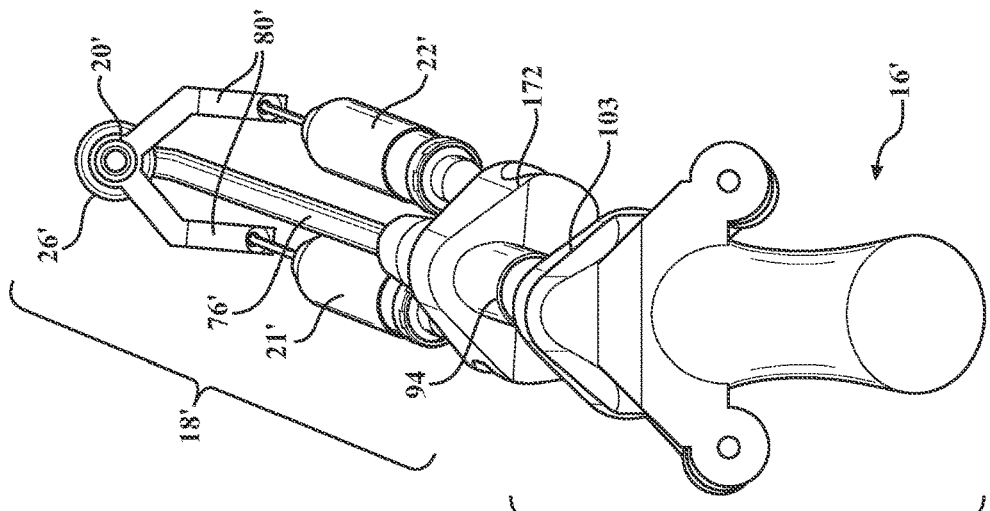
Figure 16A:
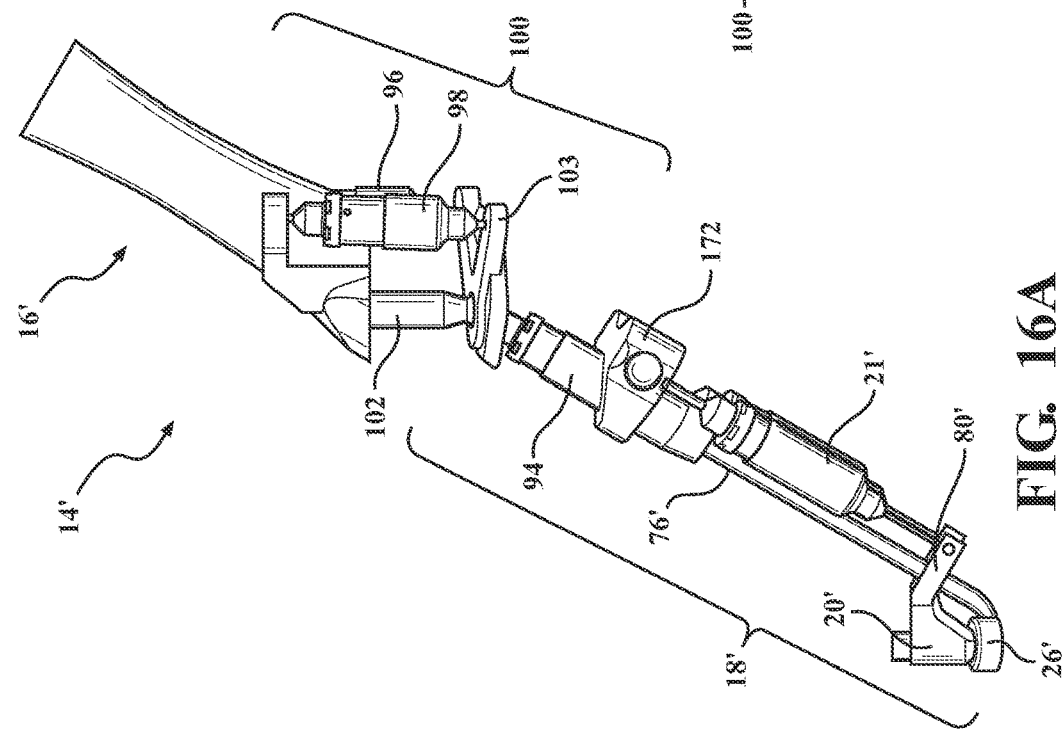

FIGS. 16A-16C show actuators 96, 98 adjusting the position of the instrument 14' into a right disposition. The positioning assembly 100 is moved to the right when actuator 96 is extended and actuator 98 is retracted. The positioning assembly 100 moves the adjustment base 103, changing the position of the trajectory assembly 18'. The trajectory actuators 21', 22' compensate for the right disposition, adjusting the trajectory of the guide member 20' by extending actuator 22' and retracting actuator 21', causing the guide arms 80' to adjust the guide member into a trajectory substantially matching the angle at which the hand-held portion 16 is positioned. Similarly, FIGS. 17A-17C show the instrument 14' with a left disposition. The positioning assembly 100 has positioned the adjustment base 103 to the left by extending actuator 98 and retracting actuator 96. The trajectory assembly 18' adjusts actuator 22' to retract, pulling one of the guide arms 80' up and expands actuator 21' pushing the other guide arm 80' down. The guide member 20' is subsequently moved to the desired trajectory relative to the position of the hand-held portion 16'.

Figure 19A:
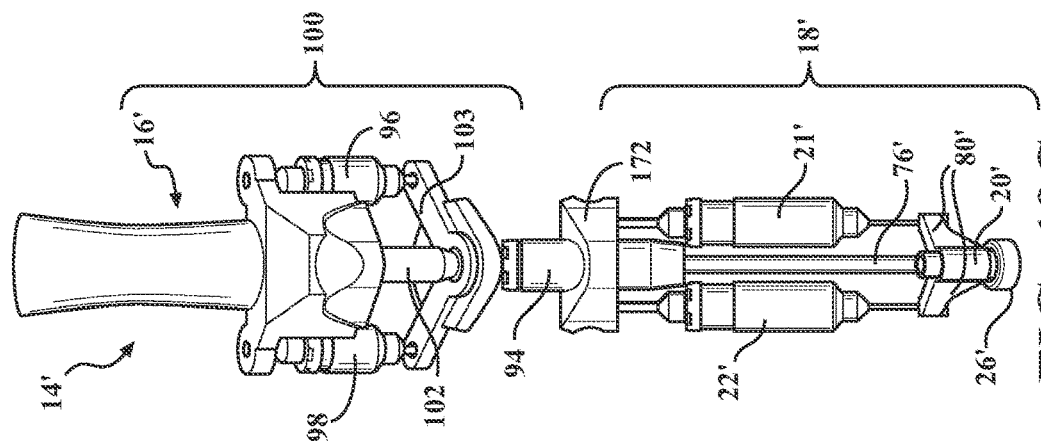
FIGS. 19A-19C display perspective views of the instrument of FIG. 14 in with a neutral trajectory and a backward disposition.
Figure 19B:
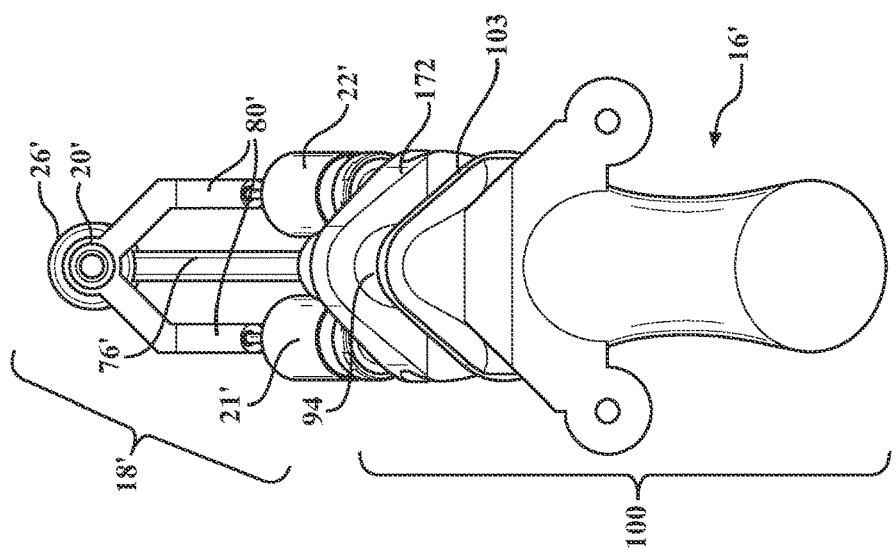
Figure 19C:
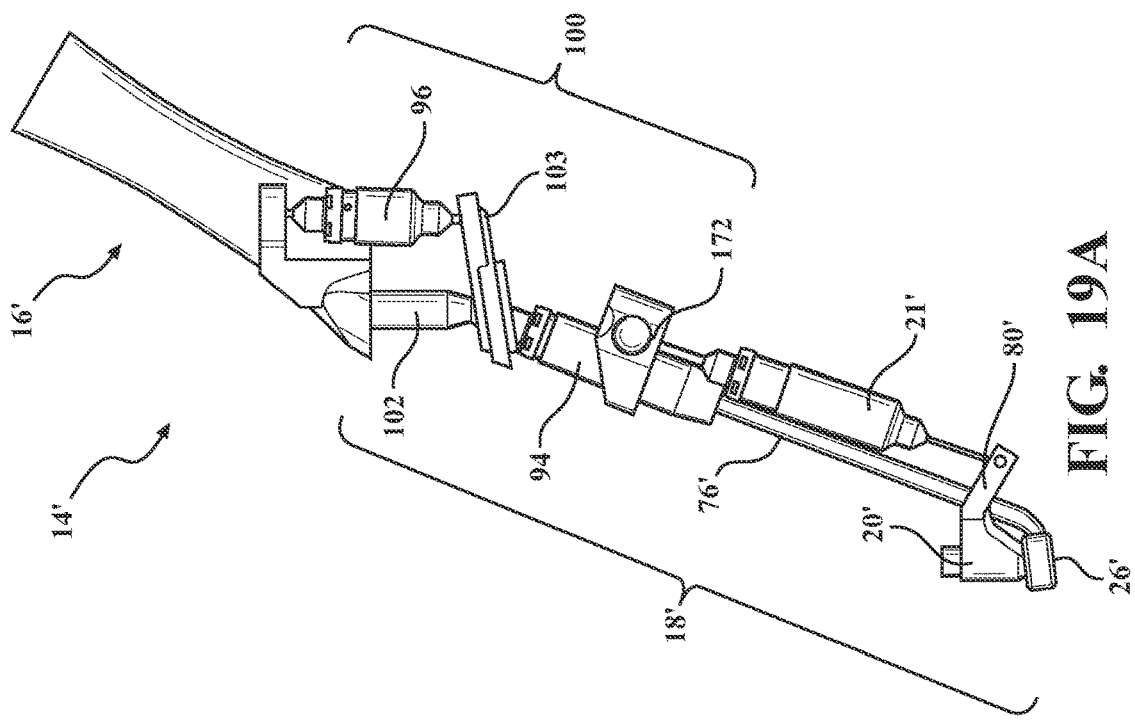

Turning to FIGS. 18A-18C and 19A-19C, the positioning actuators 96, 98 are in a centered position. FIGS. 18A-8C depict the translation actuator 94 in an extended position, causing the trajectory assembly to be tilted forward. To compensate for the forward tilt, the trajectory assembly actuators 21', 22' are retracted, adjusting the guide member 20' towards the trajectory assembly 18', maintaining a trajectory which is perpendicular. Similarly, FIGS. 19A-19C depict the translation actuator 94 in a fully retracted position causing the trajectory assembly 18' to be tilted backwards. To compensate for the movement, the trajectory actuators 21', 22' are extended, pushing the control arms 80' down, causing the guide member 20' to adjust to a perpendicular trajectory.

Further configurations of the positioning assembly, trajectory assembly, actuators, active joints, and constraint assembly are possible. In some versions, the constraint assembly may be absent and the trajectory assembly 18' of the instrument 14' may be able to move in additional degrees of freedom relative to the hand-held portion 16'.

Operation

The software employed by the control system 60 to control operation of the instrument 14 includes a boundary generator 182 (see FIG. 9). The boundary generator 182 may be implemented on the instrument controller 28, the navigation controller 36, and/or on other components, such as on a separate controller. The boundary generator 182 may also be part of a separate system that operates remotely from the instrument 14. Referring to FIG. 22, the boundary generator 182 is a software program or module that generates one or more virtual boundaries 184 for constraining movement and/or operation of the instrument 14. Virtual boundaries 184 may be provided to delineate various operational/control regions as described below. The virtual boundaries 184 may be one-dimensional (1D), two-dimensional (2D), three-dimensional (3D), and may comprise a point, line, axis, trajectory, plane (an infinite plane or plane segment bounded by the anatomy or other boundary), volume or other shapes, including complex geometric shapes. The virtual boundaries 184 may be represented by pixels, point clouds, voxels, triangulated meshes, other 2D or 3D models, combinations thereof, and the like. U.S. Patent Publication No. 2018/0333207 and U.S. Pat. No. 8,898,043 are incorporated by reference, and any of their features may be used to facilitate planning or execution of the surgical procedure.

The virtual boundaries 184 may be used in various ways. For example, the control system 60 may: control certain movements of the guide member 20 to stay inside the boundary; control certain movements of the guide member 20 to stay outside the boundary; control certain movements of the guide member 20 to stay on the boundary (e.g., stay on a point and/or trajectory); control certain movements of the guide member 20 to approach the boundary (attractive boundary) or to be repelled from the boundary (repulsive boundary); and/or control certain operations/functions of the instrument 14 based on a relationship of the instrument 14 to the boundary (e.g., spatial, velocity, etc.). Other uses of the boundaries 184 are also contemplated.

In some examples, one of the virtual boundaries 184 is a desired trajectory, as shown in FIG. 3. The control system 60 will ultimately function to keep the guide member 20 on the desired trajectory in some versions. The virtual boundary 184 that controls positioning of the guide member 20 may also be a volumetric boundary, such as one having an area slightly larger than a drill, pedicle screw, and/or pin to constrain the guided utensil to stay within the boundary and on a desired trajectory, as shown in FIG. 3. Therefore, the desired trajectory can be defined by a virtual line segment boundary, a virtual volumetric boundary, or other forms of virtual boundary. Virtual boundaries 184 may also be referred to as virtual objects. The virtual boundaries 184 may be defined with respect to an anatomical model AM, such as a 3D bone model (see FIG. 3, which illustrates the anatomical model AM being virtually overlaid on the actual humerus H due to their registration). In other words, the points, lines, axes, trajectories, planes, volumes, and the like, that are associated with the virtual boundaries 184 may be defined in a coordinate system that is fixed relative to a coordinate system of the anatomical model AM such that tracking of the anatomical model AM (e.g., via tracking the associated anatomy to which it is registered) also enables tracking of the virtual boundary 184.

The anatomical model AM is registered to the first patient tracker 54 such that the virtual boundaries 184 become associated with the anatomical model AM and associated coordinate system. The virtual boundaries 184 may be implant-specific, e.g., defined based on a size, shape, volume, etc. of an implant and/or patient-specific, e.g., defined based on the patient's anatomy. The virtual boundaries 184 may be boundaries that are created pre-operatively, intra-operatively, or combinations thereof. In other words, the virtual boundaries 184 may be defined before the surgical procedure begins, during the surgical procedure (including during tissue removal), or combinations thereof. The virtual boundaries 184 may be provided in numerous ways, such as by the control system 60 creating them, receiving them from other sources/systems, or the like. The virtual boundaries 184 may be stored in memory for retrieval and/or updating.

Figure 21:
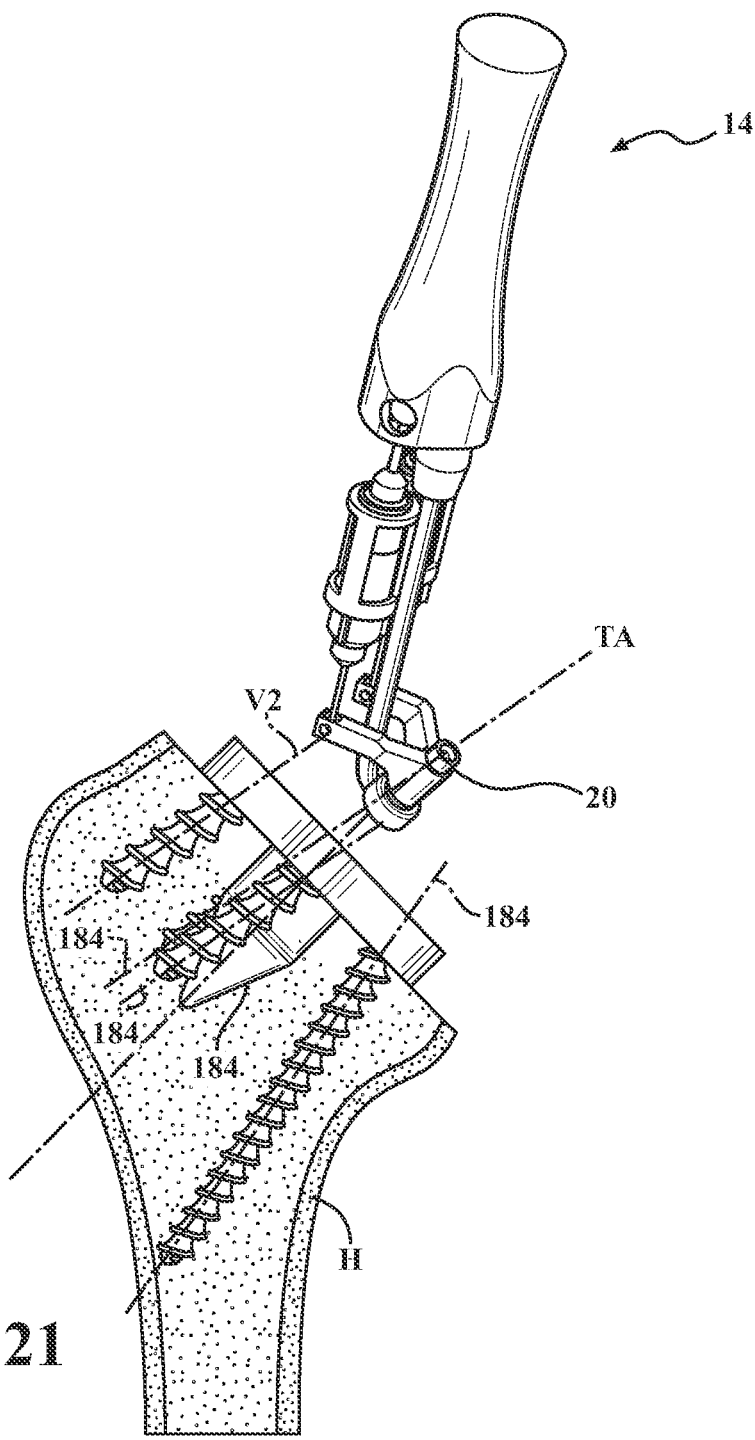
FIG. 21 is a perspective view of the instrument aligning desired trajectories for installing the implant.

In some cases, such as when preparing the humerus H for receiving the shoulder implant IM as in FIGS. 20A-20B, the virtual boundaries 184 comprise multiple planar boundaries that can be used to delineate multiple trajectories (e.g., four trajectories to secure the implant to the scapula SC) for the shoulder implant IM, and are associated with a 3D model of the distal end of the scapula SC. In one example, such as in FIG. 21, these multiple virtual boundaries 184 can be activated, one at a time, by the control system 60 to constrain cutting to one plane at a time.

The instrument controller 28 and/or the navigation controller 36 track the state of the guide member 20 relative to the virtual boundaries 184. In one example, the state of the TCP coordinate system (e.g., pose of the guide member) is measured relative to the virtual boundaries 184 for purposes of determining target positions for the actuators 21, 22 so that the guide member 20 remains in a desired state.

Referring back to FIG. 9, two additional software programs or modules run on the instrument controller 28 and/or the navigation controller 36. One software module performs behavior control 186. Behavior control 186 is the process of computing data that indicates the next commanded/desired position and/or orientation (e.g., desired pose) for the guide member 20. In some cases, only the desired position of the TCP is output from the behavior control 186, while in some cases, the commanded pose of the guide member 20 is output. Output from the boundary generator 182 (e.g., a current position and/or orientation of the virtual boundaries 184 in one or more of the coordinate systems) may feed as inputs into the behavior control 186 to determine the next commanded position of the actuators 21, 22 and/or orientation for the guide member 20. The behavior control 186 may process this input, along with one or more other inputs described further below, to determine the commanded pose.

The instrument controller 28 may control the one or more actuators 21, 22 by sending command signals to each actuator 21, 22 to adjust the guide member 20 towards a desired pose. The instrument controller 28 may know the entire length that an actuator 21, 22 may adjust the trajectory assembly 18 relative to the hand-held portion 16. In some examples, the instrument controller 28 knows the entire length which an actuator 21, 22 is capable of adjusting and may send command signals to the actuators 21, 22 to move a measured distance from position to position. A measured position may be a known position, or a distance between the present location of an actuator 21, 22 and the actuator limits. Each position that the actuator 21, 22 moves to may be a measured distance from a positive limit and a negative limit of actuator travel (i.e. a position between two ends of a lead screw). The instrument controller 28 may command the actuators 21, 22 to and from measured positions as described below.

The instrument controller 28 may send command signals to each actuator 21, 22 to move the actuators 21, 22 from a first position to a commanded position which will place the guide member 20 into a desired pose. In some examples, the commanded position may be determined by the instrument controller 28 in conjunction with the navigation system 32 to determine the location of the guide member 20 and trajectory assembly 18 relative to the hand-held portion 16, patient trackers PT, 54, 56, a virtual object, such as desired trajectory or a combination thereof and send a signal to the actuators 21, 22 to adjust a certain distance in order to place the guide member 20 into the desired pose. The instrument controller may command the actuator 21, 22 to a position in order to reach the desired adjustment of the guide member 20. The instrument controller 28 may control the actuators 21, 22 to linearly move a calculated distance to adjust the guide member 20 towards a desired pose to provide for a desired trajectory. In other examples, such as when absolute encoders are used, the instrument controller may send signals to the actuators 21, 22 to place each actuator 21, 22 into the desired position based on the known location of the trajectory assembly 18 relative to the hand-held portion 16 determined by the absolute encoder.

In some examples, when one or more of the actuators 21, 22 have reached their limit, the instrument controller 28 may require the hand-held portion 16 to be adjusted in order to bring the guide member 20 back into a range where the actuators are capable of adjusting the guide member 20 towards the desired pose and trajectory. The instrument may include a user interface UI on the display 38, an optional guidance array or both to signal to a user that the hand-held portion 16 needs to be moved in particular way to place the guide member 20 at the desired pose. In some examples, user interface UI on the display 38, the optional guidance array, or both to signal to a user to move the hand-held portion 16 in the same fashion as if the actuators 21, 22 were adjusting the guide member 20, but relies on the user to correct the position of the guide member 20 by manipulating the hand-held portion 16 while the actuators remain in the target orientation holding the desired trajectory.

The second software module performs motion control 188. One aspect of motion control 188 is the control of the instrument 14. The motion control 188 receives data defining the target pose from the behavior control 186. Based on these data, the motion control 188 determines the next rotor position of the rotors 148 of each actuator 21, 22 (e.g., via inverse kinematics) so that the instrument 14 is able to position the guide member 20 as commanded by the behavior control 186. In one version, the motion control 188 regulates the rotor position of each motor 142 and continually adjusts the torque that each motor 142 outputs to, as closely as possible, ensure that the motor 142 drives the associated actuator 21, 22 to the target rotor position.

In some versions, the instrument controller 28, for each actuator 21, 22 determines the difference between a measured position and a target position of the rotor 148. The instrument controller 28 outputs a target current (proportional to a torque of the rotor), changing the voltage to adjust the current at the actuator from an initial current to the target current. The target current effectuates a movement of the actuators 21, 22 moving the guide member 20 from the measured pose to the target pose. This may occur after the target pose is converted to joint positions. In one example, the measured position of each rotor 148 may be derived from the sensor S described above, such as an encoder.

The boundary generator 182, behavior control 186, and motion control 188 may be sub-sets of a software program. Alternatively, each may be software programs that operate separately and/or independently in any combination thereof. The term "software program" is used herein to describe the computer-executable instructions that are configured to carry out the various capabilities of the technical solutions described. For simplicity, the term "software program" is intended to encompass, at least, any one or more of the boundary generator 182, behavior control 186, and/or motion control 188. The software program can be implemented on the instrument controller 28, navigation controller 36, or any combination thereof, or may be implemented in any suitable manner by the control system 60.

A clinical application 190 may be provided to handle user interaction. The clinical application 190 handles many aspects of user interaction and coordinates the surgical workflow, including pre-operative planning, implant placement and retention, registration, bone preparation visualization, and post-operative evaluation of implant fit, etc. The clinical application 190 is configured to output to the displays 38. The clinical application 190 may run on its own separate processor or may run alongside the instrument controller 28 and/or the navigation controller 36. In one example, the clinical application 190 interfaces with the boundary generator 182 after implant placement is set by the user, and then sends the virtual boundaries 184 returned by the boundary generator 182 to the instrument It should be appreciated that other types of feedback could be employed to help guide the user, such as audible, tactile (e.g., vibrations), or the like. Other types of visual feedback could also be employed, such as using augmented reality techniques, projecting light onto the anatomy, or the like.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller(s) may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The controller may communicate with other controllers using the interface circuit(s). Although the controller may be depicted in the present disclosure as logically communicating directly with other controllers, in various configurations the controller may actually communicate via a communications system. The communications system includes physical and/or virtual networking equipment such as hubs, switches, routers, and gateways. In some configurations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various configurations, the functionality of the controller may be distributed among multiple controllers that are connected via the communications system. For example, multiple controllers may implement the same functionality distributed by a load balancing system. In a further example, the functionality of the controller may be split between a server (also known as remote, or cloud) controller and a client (or, user) controller.

Some or all hardware features of a controller may be defined using a language for hardware description, such as IEEE Standard 1364-2005 (commonly called "Verilog") and IEEE Standard 10182-2008 (commonly called "VHDL"). The hardware description language may be used to manufacture and/or program a hardware circuit. In some configurations, some or all features of a controller may be defined by a language, such as IEEE 1666-2005 (commonly called "SystemC"), that encompasses both code, as described below, and hardware description.

The various controller programs may be stored on a memory circuit. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SENSORLINK, and Python® controller 28 for execution.

I. A surgical robotic instrument, the instrument comprising: a hand-holdable body; and a trajectory assembly operatively connected with the hand-holdable body, the trajectory assembly including: a shaft extending from the hand-holdable body, a pivot frame connected with a distal end of the shaft; a tool pivotally connected with the pivot frame; a retainer for coupling the pivot frame to the guide member; a support member outwardly extending from and connected with the tool; and two actuators pivotally coupled with the support member, wherein the tool is adjusted to a target trajectory with the actuators, adjusting a trajectory axis of the tool in at least two degrees of freedom to align the trajectory axis with the target trajectory; and wherein the retainer maintains the connection of the tool and the pivot frame as the actuators adjust the tool to the target trajectory.

II. A robotically-assisted handholdable instrument comprising: a hand-holdable body adapted to be freely held and moved by a hand of a user; a positioning assembly operatively connected to the hand-holdable body, the positioning assembly including a plurality of positioning actuators pivotally connected with the hand-holdable body; and a second actuator assembly operatively connected with the plurality of actuators of the positioning assembly, the second actuator assembly including: a shaft; a pivot frame connected with the shaft; an end effector pivotally connected with the pivot frame; a support member connected with the end effector; and two actuators pivotally connected to the support member; wherein the plurality of positioning actuators operatively connect the positioning assembly with the second actuator assembly.

III. A computer implement method or software product for using a robotic instrument, the robotic instrument including a hand-holdable body connected with a trajectory assembly, the trajectory assembly including a pivot frame, an end effector, and a plurality of actuators, each actuator pivotally connected with the hand-holdable body and the end effector, the method comprising, or the product including, the steps of: moving the trajectory assembly in two degrees of freedom relative to the hand-holdable body by actively adjusting one or more effective lengths of the plurality of actuators; and constraining movement of the end effector relative to the hand-holdable body in three degrees of freedom.

IV. A computer-implemented method or software product for using a robotic guide instrument, the robotic guide instrument including a hand-holdable body connected with a positioning assembly including a plurality of positioning actuators pivotally connected with the hand-holdable body and a trajectory assembly, the trajectory assembly including a pivot frame, a guide member or end effector, and a plurality of trajectory actuators, each trajectory actuator pivotally connected with the guide member or end effector, the method comprising the steps of or the program including software to perform the steps: adjusting the positioning assembly in three degrees of freedom relative to the hand-holdable body; actively adjusting one or more effective lengths of the plurality of positioning actuators, moving the trajectory assembly in three degrees of freedom; moving the trajectory assembly in two degrees of freedom relative to the hand-holdable body and the positioning assembly by actively adjusting one or more effective lengths of the plurality of trajectory actuators; and constraining movement of the guide member or end effector relative to the hand-holdable body and the positioning assembly in three degrees of freedom.

It should be understood that the combination of position and orientation of an object is referred to as the pose of the object. Throughout this disclosure, it is contemplated that the term pose may be replaced by position and/or orientation in one or more degrees of freedom and vice-versa to achieve suitable alternatives of the concepts described herein. In other words, any use of the term pose can be replaced with position and any use of the term position may be replaced with pose.

The methods in accordance with the present teachings is for example a computer implemented method. For example, all the steps or merely some of the steps (i.e. less than the total number of steps) of the method in accordance with the present teachings can be executed by a computer (for example, at least one computer). A configuration of the computer implemented method is a use of the computer for performing a data processing method. Further, in the present teachings, the methods disclosed herein comprise executing, on at least one processor of at least one computer (for example at least one computer being part of the navigation system), the following exemplary steps which are executed by the at least one processor.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the present teachings. The cloud computer is for example an elastic compute cloud (EC2) as provided by Amazon Web Services™. A computer for example comprises interfaces in order to receive or output data and/or perform an analogue-to-digital conversion. For example, the present teachings may not involve or in particular comprise or encompass an invasive step which would represent a substantial physical interference with the body requiring professional medical expertise to be carried out and entailing a substantial health risk even when carried out with the required professional care and expertise. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses.) Another example of a display device would be a standard computer monitor comprising for example a liquid crystal display operatively coupled to the computer for receiving display control data from the computer for generating signals used to display image information content on the display device.

The present teachings also relate to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The present teachings also relate to a computer comprising at least one processor and/or the aforementioned computer-readable storage medium and for example a memory, wherein the program is executed by the processor.

Within the framework of the present teachings, computer program elements can be embodied by hardware and/or software (this includes firmware, resident software, microcode, etc.). Within the framework of the present teachings, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction executing system. Such a system can be a computer; a computer can be a data processing device comprising means for executing the computer program elements and/or the program in accordance with the present teachings, for example a data processing device comprising a digital processor (central processing unit or CPU) which executes the computer program elements, and optionally a volatile memory (for example a random access memory or RAM) for storing data used for and/or produced by executing the computer program elements. Within the framework of the present teachings, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet.

In this application, including the definitions below, the term "controller" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A robotically-assisted handholdable guide instrument for aligning a trajectory of a surgical device, the instrument comprising:
    a hand-holdable body adapted to be freely holdable and moved by a hand of a user; and
    a trajectory assembly operatively connected with the hand-holdable body, the trajectory assembly including:
        a shaft extending from the hand-holdable body;
        a pivot frame coupled with the shaft;
        a guide member pivotally connected with the pivot frame;
        a support member outwardly extending from and connected with the guide member;
        two actuators coextending and substantially parallel to an axis of the shaft, each actuator pivotally connected with the support member;
    wherein the trajectory assembly converts linear movement of the actuators into pivotal movement of the guide member to adjust a trajectory axis, the actuators selectively configured to push and pull the support member connected with the guide member; and
    wherein the guide member is adjustable to a target trajectory with the actuators, adjusting the trajectory axis of the guide member in at least two degrees of freedom to align the trajectory axis with the target trajectory.

2. The guide instrument of claim 1, wherein the guide member is configured to allow a surgical device to pass through during a surgical procedure.

3. The guide instrument of claim 1, wherein the pivot frame includes a recess along an inner surface of the pivot frame, a retainer is disposed within the recess, maintaining the guide member and pivot frame connection as the actuators adjust the guide member to the target trajectory.

4. The guide instrument of claim 3, wherein the pivot frame and the guide member includes a retention assembly, the retention assembly including a protrusion and a complimentary pocket.

5. The guide instrument of claim 4, wherein the retention assembly restricts rotation of the guide member relative to the pivot frame, maintaining the target trajectory during actuation of the actuators.

6. The guide instrument of claim 1, wherein the actuators control a pitch and a roll of the guide member to align the guide member with the target trajectory.

7. A surgical guide instrument for placing a pin into bone:
a guide instrument adapted to be freely holdable and moved by a hand of a user, the guide instrument comprising:
  a hand-holdable body; and
  a trajectory assembly operatively connected with the hand-holdable body, the trajectory assembly including:
    a shaft extending from the hand-holdable body,
    a pivot frame connected with a distal end of the shaft;
    a guide member pivotally connected with the pivot frame;
    a retainer for coupling the pivot frame to the guide member;
    a support member outwardly extending from and connected with the guide member; and
    two actuators pivotally coupled with the support member,
wherein the guide member is adjusted to a target trajectory with the actuators, adjusting a trajectory axis of the guide member in at least two degrees of freedom to align the trajectory axis with the target trajectory; and
wherein the retainer maintains the connection of the guide member and the pivot frame as the actuators adjust the guide member to the target trajectory.

8. The surgical guide instrument of claim 7, wherein the pivot frame includes a protrusion extending from an inner surface of the pivot frame, and the guide member includes a groove in an outer surface of the guide member that is complimentary to the protrusion.

9. The guide instrument of claim 7, wherein the guide member is configured to allow a surgical device to pass through during a surgical procedure.

10. The guide instrument of claim 7, wherein the pivot frame includes a recess along an inner surface of the pivot frame, a retainer is disposed within the recess, maintaining the guide member and pivot frame connection as the actuators adjust the guide member to the target trajectory.

11. The guide instrument of claim 10, wherein the pivot frame and the guide member includes a retention assembly, the retention assembly including a protrusion and a complimentary pocket.

12. The guide instrument of claim 11, wherein the retention assembly restricts rotation of the guide member relative to the pivot frame, maintaining the target trajectory during actuation of the actuators.

13. The guide instrument of claim 7, wherein the actuators control a pitch and a roll of the guide member to align the guide member with the target trajectory.

14. A robotically-assisted handholdable guide instrument comprising:
a hand-holdable body adapted to be freely held and moved by a hand of a user;
a positioning assembly operatively connected to the hand-holdable body, the positioning assembly including a plurality of positioning actuators pivotally connected with the hand-holdable body; and
a trajectory assembly operatively connected with the plurality of actuators of the positioning assembly, the trajectory assembly including:
  a shaft;
  a pivot frame connected with the shaft;
  a guide member pivotally connected with the pivot frame;
  a support member connected with the guide member; and
  two trajectory actuators pivotally connected to the support member;
wherein the plurality of positioning actuators operatively connect the positioning assembly with the trajectory assembly, the plurality of positioning actuators are configured to adjust a pose of the trajectory assembly in at least three degrees of freedom; and
wherein trajectory assembly adjusts the guide member to a target trajectory with the trajectory actuators, adjusting a trajectory axis of the guide member in at least two degrees of freedom to align the trajectory axis with the target trajectory.

15. The guide instrument of claim 14, wherein the guide member is configured to allow a surgical device to pass through during a surgical procedure.

16. The guide instrument of claim 14, wherein the positioning assembly adjusts the trajectory assembly into a target position.

17. The guide instrument of claim 14, wherein the positioning actuators control a pitch, a roll, and a translation of the trajectory assembly relative to the hand-holdable body.

18. The guide instrument of claim 17, wherein the trajectory actuators control a pitch and a roll of the guide member relative to the positioning assembly to align the guide member with the target trajectory.

* * * * *